(12) United States Patent
Schlanger

(10) Patent No.: US 9,302,733 B2
(45) Date of Patent: Apr. 5, 2016

(54) BICYCLE CRANK ASSEMBLY

(76) Inventor: Raphael Schlanger, Wilton, CT (US)

( * ) Notice: Subject to any disclaimer, the term of this patent is extended or adjusted under 35 U.S.C. 154(b) by 1335 days.

(21) Appl. No.: 12/807,184

(22) Filed: Aug. 31, 2010

(65) Prior Publication Data

US 2010/0326233 A1 Dec. 30, 2010

Related U.S. Application Data

(63) Continuation-in-part of application No. 11/273,776, filed on Nov. 15, 2005, now Pat. No. 7,784,378.

(60) Provisional application No. 60/628,773, filed on Nov. 17, 2004.

(51) Int. Cl.
*B62M 3/00* (2006.01)

(52) U.S. Cl.
CPC ............. *B62M 3/003* (2013.01); *Y10T 74/2164* (2015.01)

(58) Field of Classification Search
CPC ...... B62M 3/00; B62M 3/003; Y10T 74/2164
USPC ............... 74/594.1, 594.2; 280/259, 260, 261
See application file for complete search history.

(56) References Cited

U.S. PATENT DOCUMENTS

| | | | |
|---|---|---|---|
| 3,039,791 A * | 6/1962 | Horowitz et al. | 280/259 |
| 5,016,895 A * | 5/1991 | Hollingsworth et al. | 280/280 |
| 5,078,417 A * | 1/1992 | Mouritsen | 280/280 |
| 5,941,135 A * | 8/1999 | Schlanger | 74/594.1 |
| 5,944,932 A * | 8/1999 | Klein et al. | 156/245 |
| 6,116,114 A * | 9/2000 | Edwards | 74/594.1 |
| 6,443,033 B1 * | 9/2002 | Brummer et al. | 74/594.1 |
| 6,564,675 B1 * | 5/2003 | Jiang | 74/594.1 |
| 7,650,818 B2 * | 1/2010 | Inoue et al. | 74/594.1 |
| 7,784,378 B2 * | 8/2010 | Schlanger | 74/594.1 |
| 2001/0049976 A1 * | 12/2001 | Dodman | 74/594.1 |
| 2003/0051573 A1 * | 3/2003 | Ording et al. | 74/594.1 |
| 2004/0211289 A1 * | 10/2004 | Chiang et al. | 74/594.1 |
| 2005/0011304 A1 * | 1/2005 | Chiang | 74/594.1 |
| 2005/0022625 A1 * | 2/2005 | Nonoshita | 74/594.1 |
| 2005/0284252 A1 * | 12/2005 | Fukui | 74/594.2 |
| 2009/0056496 A1 * | 3/2009 | Dodman et al. | 74/594.1 |
| 2014/0196569 A1 * | 7/2014 | Nonoshita et al. | 74/594.2 |
| 2015/0000459 A1 * | 1/2015 | Nonoshita et al. | 74/594.1 |

* cited by examiner

*Primary Examiner* — Adam D Rogers

(57) ABSTRACT

An improved bicycle crankshaft assembly, including a crank axle with an axial axis, a first axle end, and a second axle end axially opposed to the first axle end; a first crank arm connected to the crank axle at a first crank arm interface adjacent the first axle end; a second crank arm connected to the crank axle at a second crank arm interface axially spaced from the first crank arm interface; a first bearing surrounding said crank axle adjacent said first axle end for rotation of said crank axle about said axial axis; a second bearing surrounding the crank axle and axially spaced from the first bearing. The crank axle includes reinforcement fibers for structural reinforcement of the crank axle and the crank axle is an integral crank axle that extends through the first bearing and the second bearing.

43 Claims, 13 Drawing Sheets

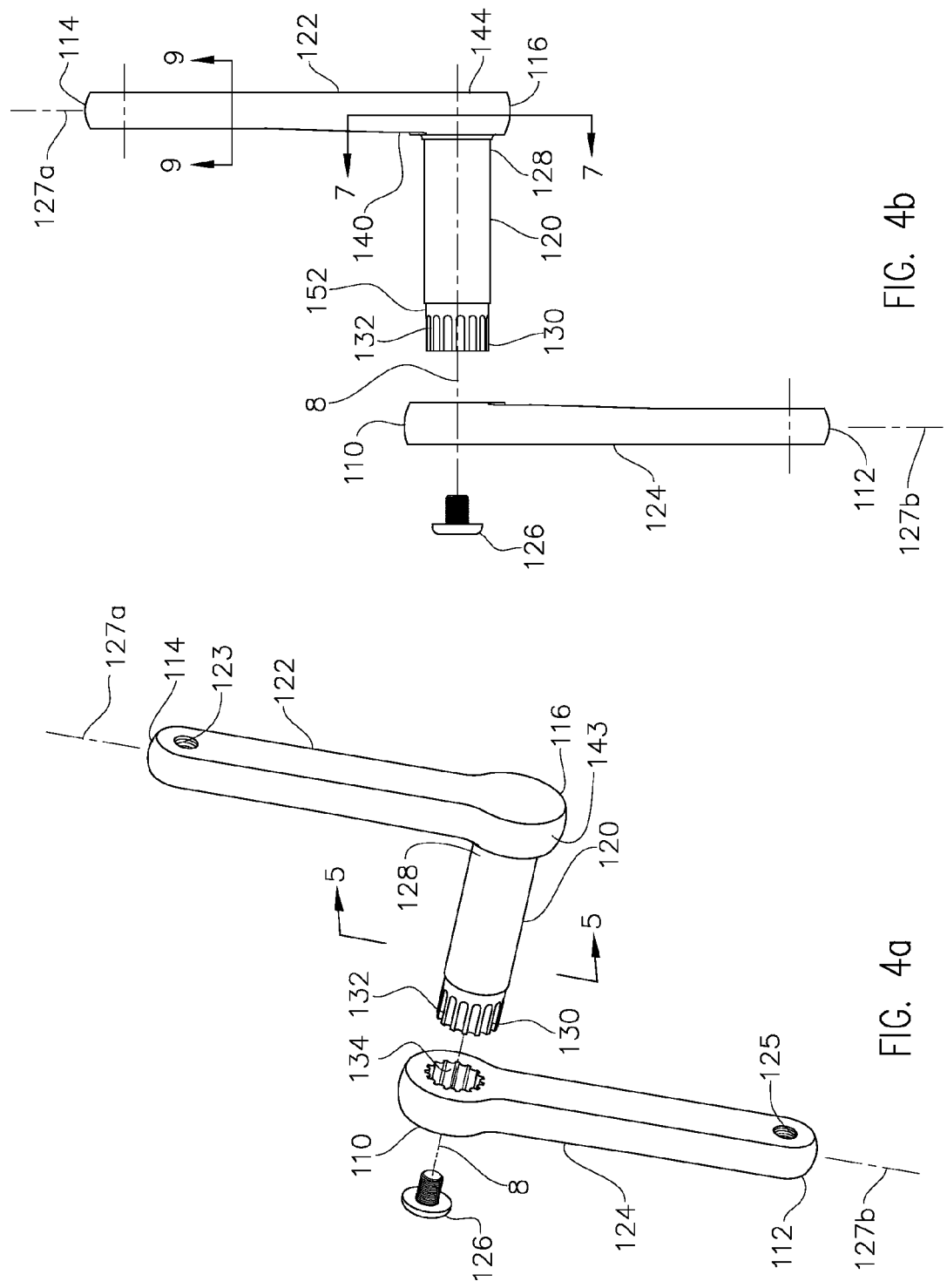

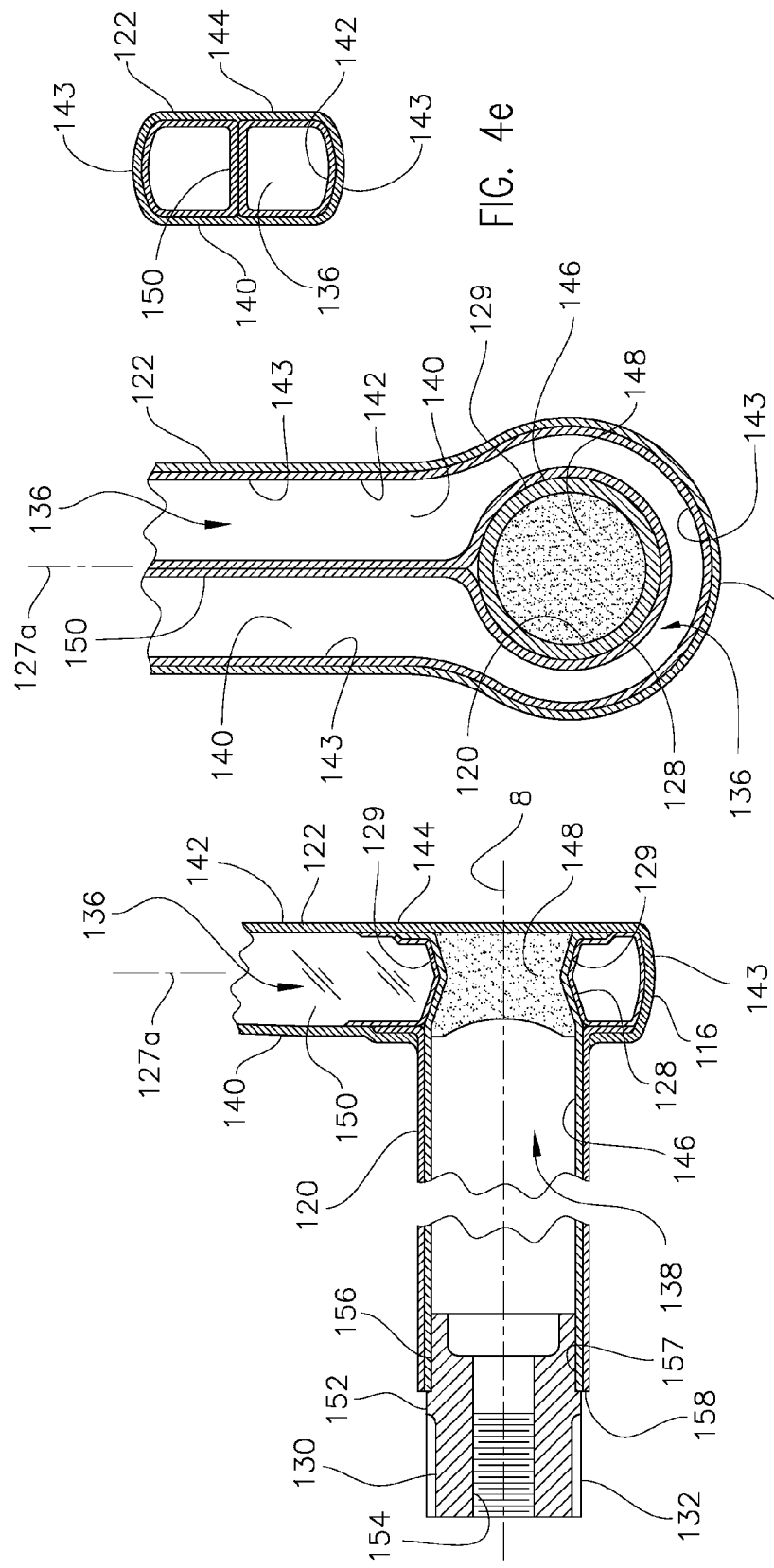

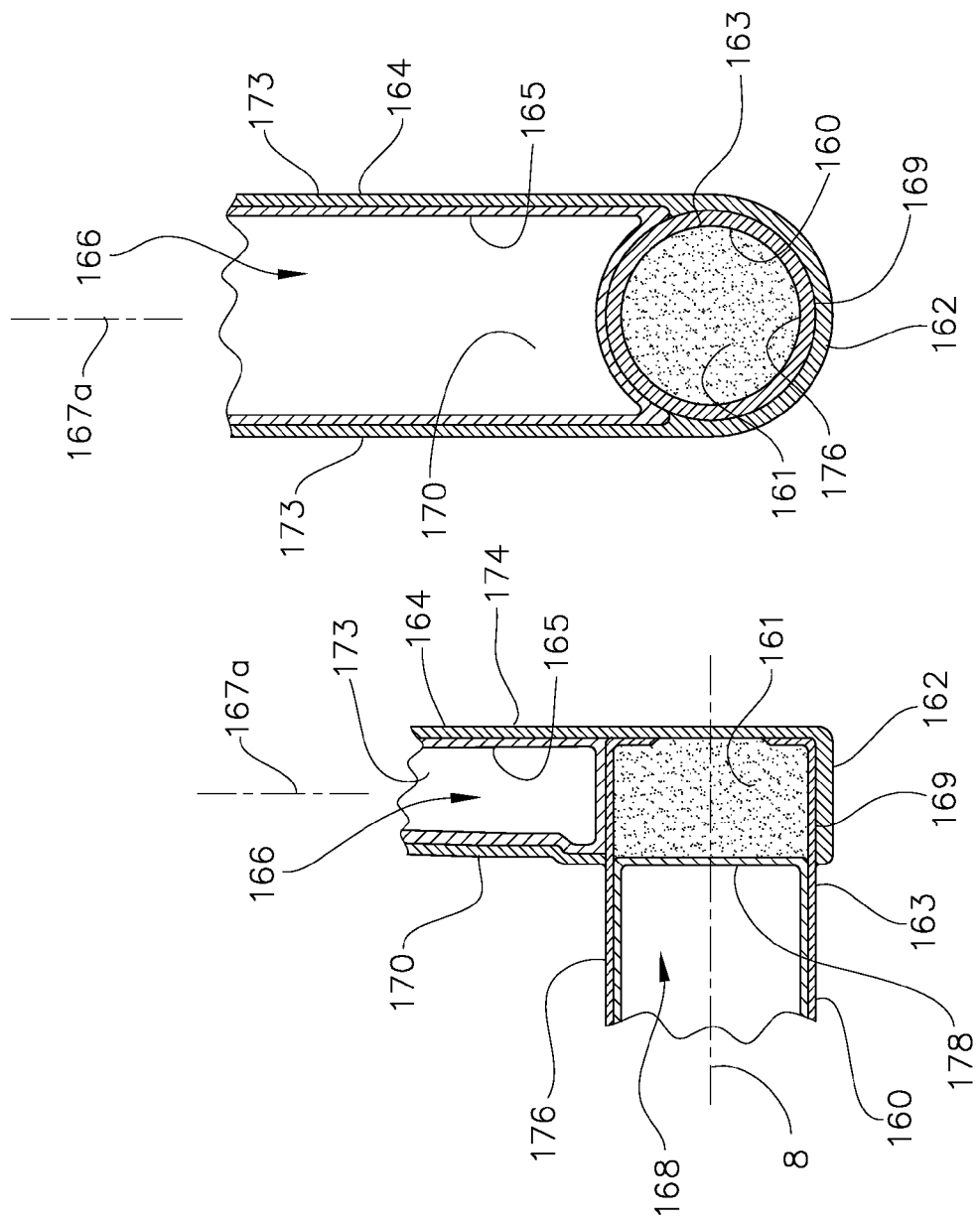

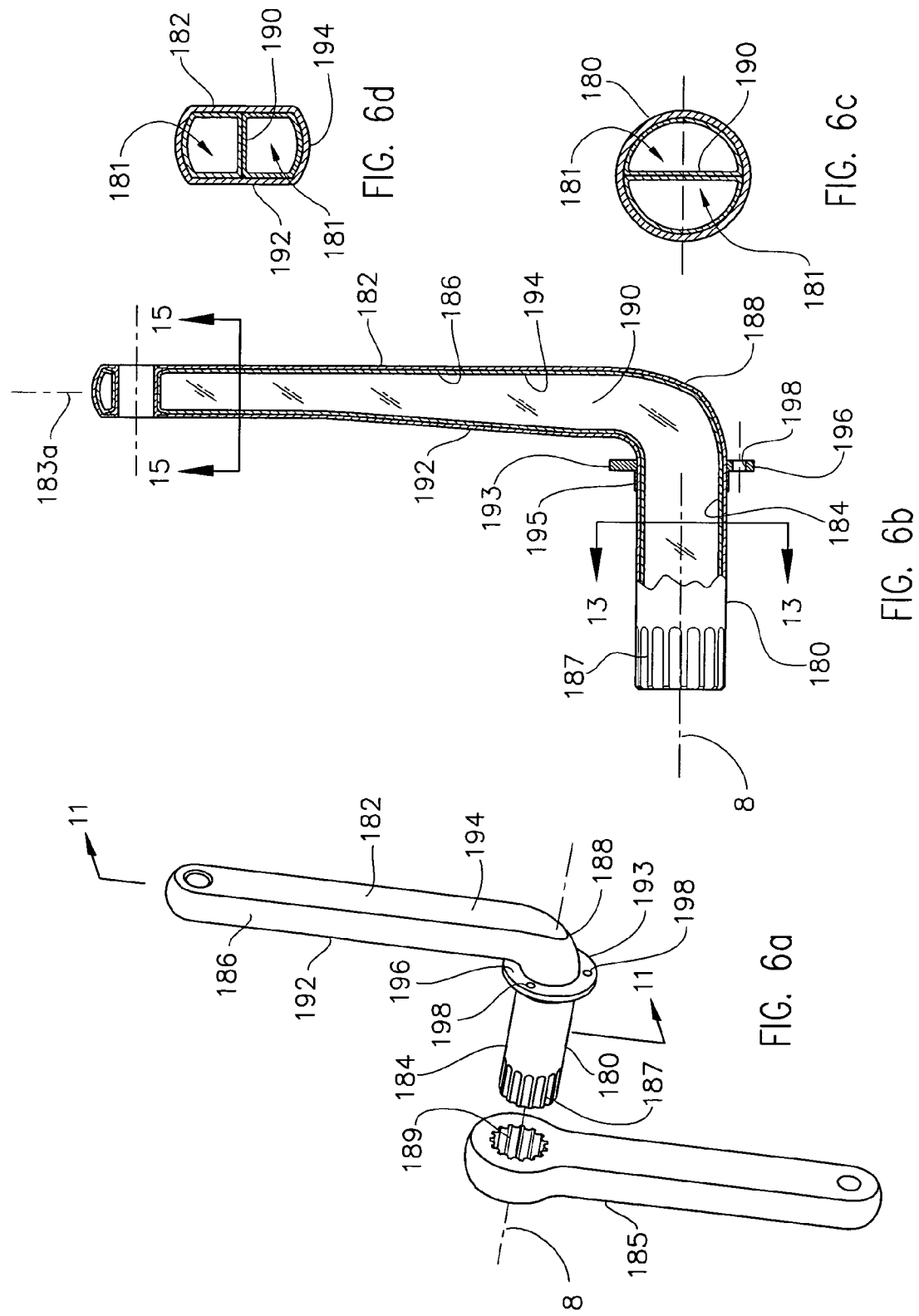

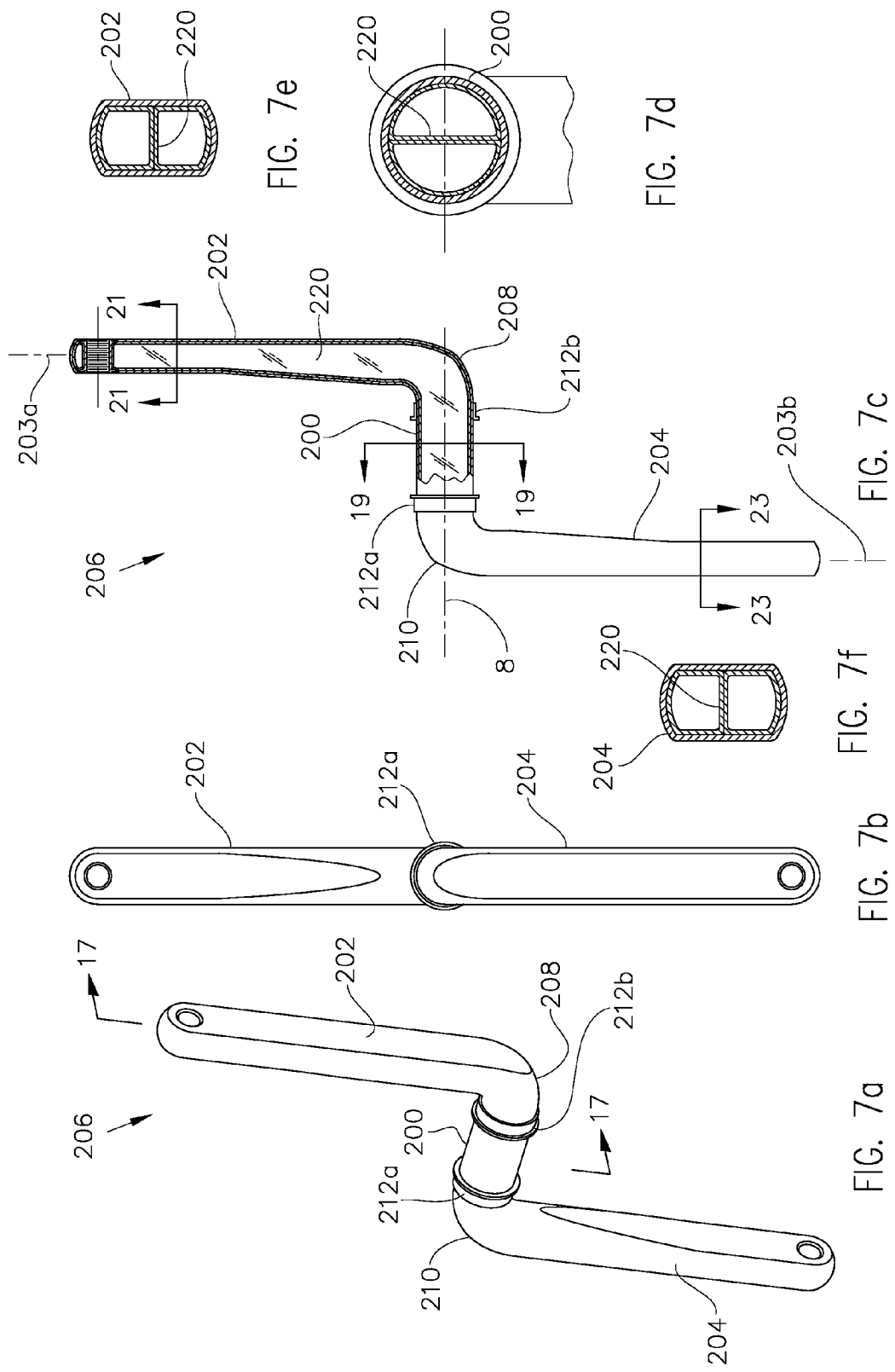

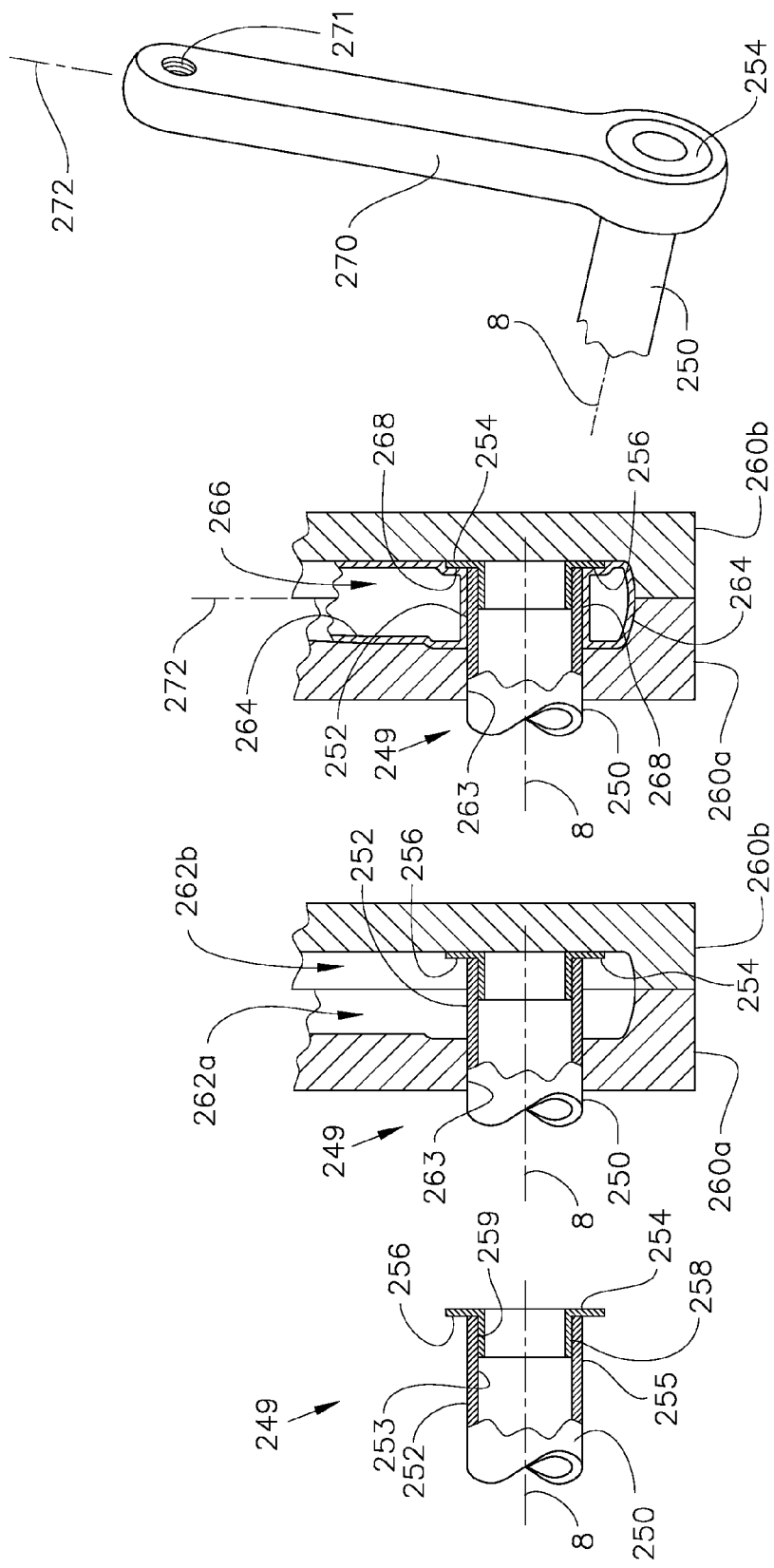

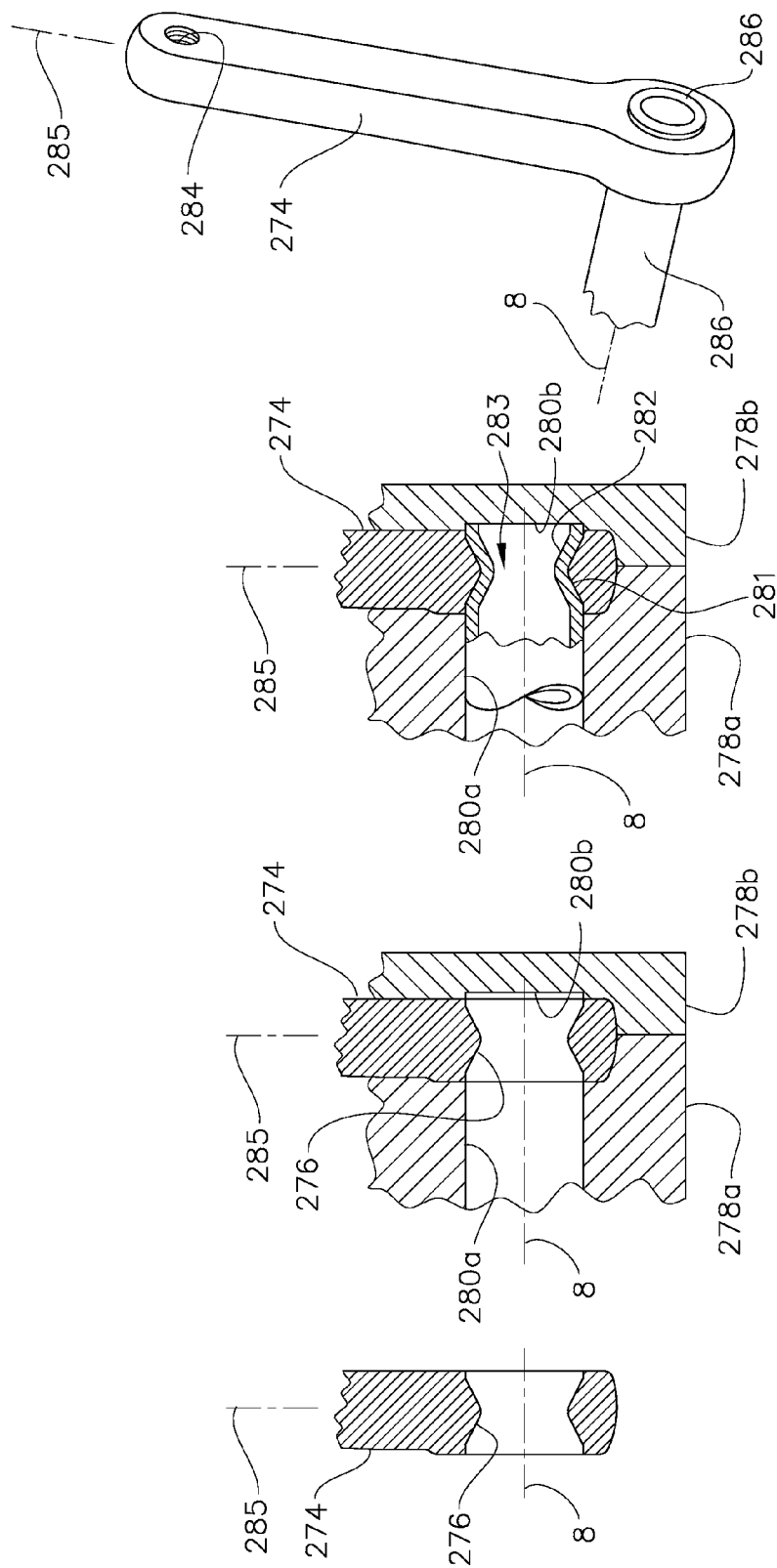

BICYCLE CRANK ASSEMBLY

CROSS-REFERENCE TO RELATED APPLICATION

This application is a Continuation-In-Part of U.S. patent application Ser. No. 11/273,776, filed Nov. 15, 2005, now U.S. Pat. No. 7,784,378 which claims priority of U.S. provisional patent application 60/628,773, filed Nov. 17, 2004, and entitled "Crank Axle Assembly".

BACKGROUND OF THE INVENTION (1) Field of the Invention

This invention is related to the crank axle of a bicycle crank assembly and is particularly related to a crank axle of fiber-reinforced construction and to the connection between a fiber-reinforced crank axle and a crank arm.

(2) Description of the Related Art

A bicycle crank assembly or crankset has traditionally been designed as a 3-piece assembly consisting of a crank axle, a left crank arm, and a right crank arm. The left crank arm is connected to the left end of the crank axle via a system of straight and/or tapered splines in combination with a fixing bolt to secure the connection. Likewise, the right crank arm is connected to the right end of the crank axle in a similar arrangement. The crank axle is radially supported and axially located by two axially spaced bearing assemblies that are located axially inboard of the crank arms. The drive sprockets, or chainrings, are mounted to the right crank arm via a "spider", which consists of a series of radial arms extending between the chainring and the axle end of the right crank arm. The crank axle is generally made of steel, while the crank arms are usually of solid aluminum construction.

More recently, some state-of-the-art designs are arranged such that the steel crank axle is permanently fixed to the right crank arm. In addition, some high-end crank arms utilize carbon fiber reinforced material in their construction. However, these crank assemblies still utilize crank axles made of steel, which is a very high-density material, and results in a crank axle that is quite heavy.

There have been some prior art cranksets that utilize a split crank axle, where a left crank axle portion is removably connected to a right crank axle portion at a connection interface that is located axially inboard from the two supporting bearings. In such designs, the left crank arm is integrally joined to the left crank axle portion and the right crank arm is integrally joined to the right crank axle. Such a connection may be considered a structural interruption of the crank axle and this type of design places this connection at a very highly stressed region of the crank axle, which may result in a weaker and/or heavier connection. Additionally, this region also has severe geometric constraints due to the surrounding bottom bracket shell (not shown) of the bicycle frame. This serves to limit the structural geometry necessary to create a strong and lightweight connection. Further, since the region of connection is completely enclosed by the bottom bracket shell and the bearings, access and means to operate the connection are severely limited. This results in further constraints on the design of this connection and further limits the ability to create a rigid, strong and lightweight connection. Needless to say, such designs have had only limited success in the marketplace.

In addition, the connection between the crank arm(s) is somewhat complex and requires the expense of precision machining and additional manufacturing steps to achieve a reliable connection. Further, this connection requires additional components, such as fixing bolt(s), which add cost and weight to the overall assembly.

Further objects and advantages of the present invention will appear hereinbelow.

SUMMARY OF THE INVENTION

In accordance with the present invention, it has now been found that the forgoing objects and advantages may be readily obtained.

Bicycle racers and cycling enthusiasts are in a constant quest to increase the performance of their equipment by reducing its weight. This is well known in the field and is particularly applicable to the rotating components of the bicycle such as the crankset. It is an object of the present invention to provide a bicycle crank assembly that is light in weight, preferably lighter than traditional crank assemblies, while maintaining the requisite structural integrity. It is a further object of the present invention to produce a lightweight crank assembly that can be produced economically to minimize any additional expense associated with the increase in performance.

The present invention utilizes a crank axle that is constructed, at least in part, from fiber reinforced composite materials that are high in strength and light in weight. This type of material is highly advantageous in a crank axle application. In addition, it is preferable that the crank axle and at least one of the crank arms be molded as one integral unit and/or as one contiguous unit.

Fiber reinforced composite materials possess very favorable structural properties, such as very high strength and stiffness, while also having a much lower density than most metals. Thus, a well-designed crank axle that utilizes composite materials may be much lighter than a comparable steel or aluminum crank axle, while maintaining, or increasing, the requisite structural properties.

In operation, as the pedals of the bicycle are rotated in their circular cycle, the orientation of the crank arms and the loads on the pedals are constantly changing. Therefore, the crank axle experiences bending stresses in multiple directions, as well as torsional stress. By carefully orienting the fiber reinforcement of the crank axle, it is possible to adjust the structural properties of the finished crank axle to be highly optimized for the loading and stresses unique the crank axle application. This permits the structural properties to be optimized while minimizing material usage. Thus further reducing the weight and cost of the crank axle.

The present invention includes embodiments where the crank axle is formed as an integral and/or monolithic contiguous unit with one or both of the crank arms. In comparison with conventional crank assemblies, the present invention may be easily adapted to this type of arrangement. Because the composite material is highly moldable, it is relatively easy to create the geometry required to create such a contiguous crank arm and crank axle. It is also relatively easy to mold the crank axle to include geometry features to mate with other components and/or to provide clearance with other components. Further, it is relatively easy to mold the crank axle to provide structural cross section for performance benefit, such as increased strength or stiffness. Such geometry would be far more difficult and expensive to achieve using metal construction. Further, because the crank axle may be constructed from layers or plies of composite material, these layers may be interleaved with the plies of a composite crank arm to create a high strength and lightweight contiguous and integral connection between these two components.

Further, the present invention describes a hollow crank arm and a hollow crank axle. It is well understood that, by locating the structural material away from the neutral axis, a hollow crank arm and/or crank axle may be significantly stronger, stiffer and/or lighter than a corresponding solid component as utilized in conventional crank assemblies.

A crank axle spans axially between two supporting bearings. In contrast to split crank axle designs, where two separate axle portions are removably connected to each other at a location between the two supporting bearings, the present invention utilizes an integral crank axle that spans directly between the two axially spaced supporting bearings without such a connection. In embodiments where a removable connection is required, such as the connection between the crank arm and an extending end portion of the crank axle, this is accomplished axially outboard of the confines of the bottom bracket shell. Therefore the aforementioned geometric constraints of an enclosed connection (between the supporting bearings) do not exist and a robust and lightweight connection may be achieved. Since the crank axle of the present invention is not a split crank axle, and may therefore be considered a one-piece crank axle. As such, the fibers may be continuous and may extend generally axially between the supporting bearings, which allows the present invention to take full advantage of the mechanical properties of this material, while minimizing the amount of material (and weight) required.

The contiguous crank arm and crank axle embodiments of the present invention may also serve to eliminate the "doubling" geometry of a conventional crank assembly where crank arm is overlapping the end of the crank axle, resulting in a comparatively heavy double wall to effect the crank arm-to-crank axle connection. Further, the contiguous crank arm and crank axle unit of the present invention eliminates the fixing bolt and related hardware of conventional crank assemblies, thereby eliminating their associated weight and expense. Still further, the splined connection between the conventional crank arm and crank axle assembly require a precision fit. The fabrication involved in this precision fit, as well as the machining to accept the fixing bolt adds expense to the conventional assembly. This cost is eliminated in contiguous crank arm and crank axle unit of the present invention.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 1b is a radial plan view of the general configuration of the crank axle of FIG. 1a;

FIG. 4a is a perspective exploded view of an additional embodiment of the present invention, schematically illustrating the assembly of an integral right crank arm and crank axle component with a left crank arm component;

FIG. 4b is a radial plan view of the assembly of FIG. 4a;

FIG. 4c is a partial cross section view of the embodiment of FIG. 4a as seen generally in the direction 5-5 of FIG. 4a;

FIG. 4d is a partial cross section view of the embodiment of FIG. 4a as seen generally in the direction 7-7 of FIG. 4b;

FIG. 4e is a partial cross section view of the embodiment of FIG. 4a as seen generally in the direction 9-9 of FIG. 4b;

FIG. 5a is a partial cross section view of an additional embodiment of the present invention in a view roughly corresponding to FIG. 4c;

FIG. 5b is a partial cross section view of the embodiment of FIG. 5a in a view roughly corresponding to FIG. 4d;

FIG. 6a is a perspective exploded view of an additional embodiment of the present invention, schematically illustrating the assembly of an integral right crank arm and crank axle component with a left crank arm component;

FIG. 6b is a partial radial cross-sectional view of the integral right crank arm and crank axle component of FIG. 6a as seen generally in the direction 11-11 of FIG. 6a;

FIG. 6c is a partial cross section view of the embodiment of FIG. 6a as seen generally in the direction 13-13 of FIG. 6b;

FIG. 6d is a partial cross section view of the embodiment of FIG. 6a as seen generally in the direction 15-15 of FIG. 6b;

FIG. 7a is a perspective view of an additional embodiment of the present invention, schematically illustrating an integral right crank arm, crank axle and left crank arm component;

FIG. 7b is an axial plan view of the integral crank embodiment of FIG. 7a;

FIG. 7c is a radial plan view of the integral crank assembly of FIG. 7a, shown in partial cross section as seen generally in the direction 17-17;

FIG. 7d is a partial cross section view of the crank axle of FIG. 7a as seen generally in the direction 19-19 of FIG. 7c;

FIG. 7e is a cross section view of the right crank arm of FIG. 7a as seen generally in the direction 21-21 of FIG. 7c;

FIG. 7f is a cross section view of the left crank arm of FIG. 7a as seen generally in the direction 23-23 of FIG. 7c;

FIG. 9a is a partial cross section view of a pre-formed crank axle assembly of an additional embodiment of the present invention;

FIG. 9b is a partial cross section view of the embodiment of FIG. 9a, including a mold to form the crank arm;

FIG. 9c is a partial cross section view of the embodiment of FIG. 9b, including a crank arm molding charge in the mold cavity;

FIG. 9d is a partial perspective view of the embodiment of FIG. 9c, including a molded crank arm integrally joined to the pre-formed crank axle assembly;

FIG. 10a is a partial cross section view of a pre-formed crank arm of an additional embodiment of the present invention;

FIG. 10b is a partial cross section view of the embodiment of FIG. 10a, including a mold to form the crank axle;

FIG. 10c is a partial cross section view of the embodiment of FIG. 10b, including a crank axle molding charge in the mold cavity;

FIG. 10d is a partial perspective view of the embodiment of FIG. 10c, including a molded crank axle integrally joined to the pre-formed crank arm;

DETAILED DESCRIPTION OF THE INVENTION

Figure 1A:
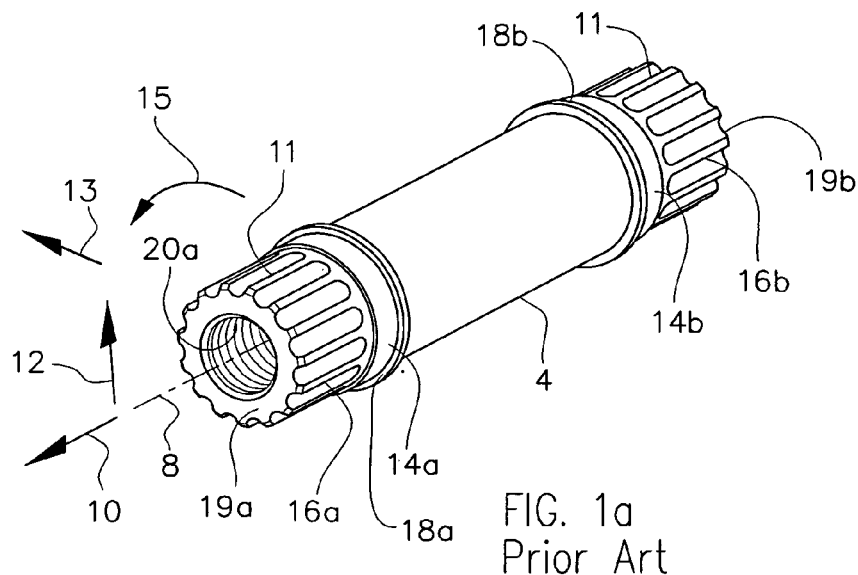
FIG. 1a is a perspective view schematically illustrating the general configuration of a crank axle.
Figure 1B:
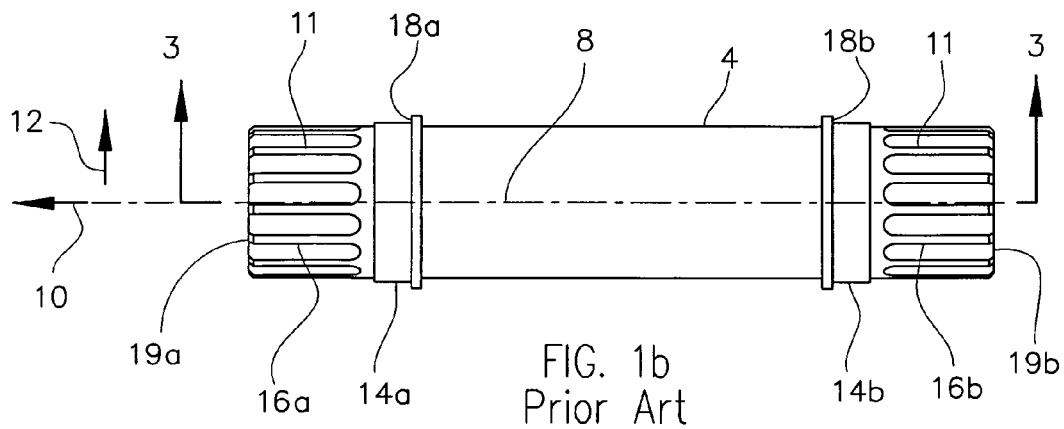
Figure 1C:
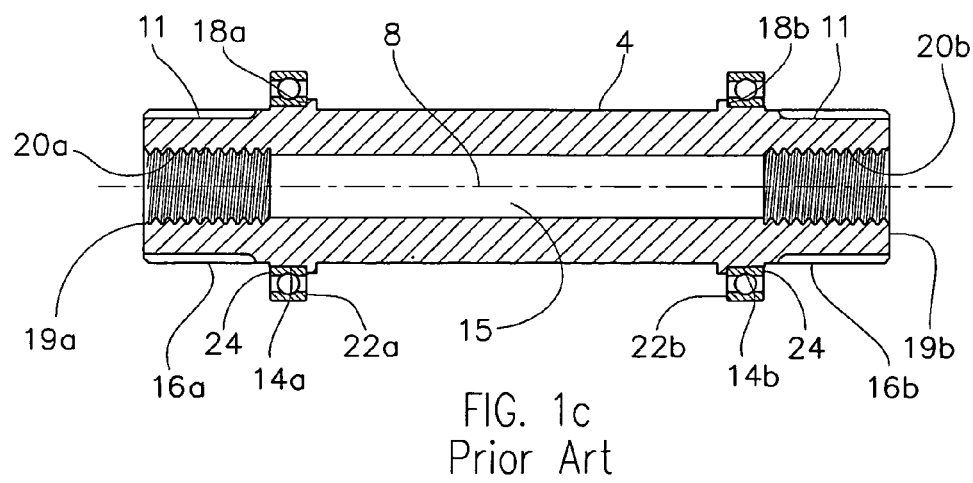
FIG. 1c is a cross-section view of the crank axle of FIG. 1a as seen generally in the direction 3-3 of FIG. 1b, including support bearings.

FIGS. 1a-c describe a prior art crank axle 4. For the sake of orientation convention in the instant application, the crank axle 4 may be considered as a generally cylindrical component that has a longitudinal or axial axis 8 about which it rotates. The axial direction 10 is a direction parallel to the axial axis 8. The radial direction 12 is a direction extending radially and perpendicular to the axial axis 8. The tangential direction 13 is a direction tangential about the axial axis 8 at a radial distance from the axial axis 8. The circumferential direction 15 is a cylindrical vector that wraps around the axial axis 8 at a given radius. The term "axially inboard" refers to an axial location proximal to a point on the axial axis 8 that is generally midway between supporting bearings or between bearing surfaces 14a and 14b. Conversely, the term "axially outboard" refers to an orientation that is distal from this point. Similarly, "radially inboard" refers to a radial orientation proximal to the axial axis 8 and "radially outboard" refers to a radial orientation distal to the axial axis 8.

Crank axle 4 has relatively conventional geometry and includes splined portions 16a and 16b with splines 11 that extend axially for mating with crank arms (not shown) in the conventional manner. Cylindrical bearing surfaces 14a and 14b are surfaces that are adapted for fitment of bearing assemblies 22a and 22b respectively. Bearing surfaces 14a and 14b may be designed to serve directly as inner bearing races or they may be adapted to fit an inner bearing race 24 of a bearing assembly 22a and/or 22b (as shown in FIG. 1c). It is understood that bearing surfaces 14a and 14b may possess any geometry or profile contour that is beneficial to adapt to their specific bearing application. In FIG. 1b, these bearing surfaces 14a and 14b are shown to be cylindrical surfaces, with corresponding shoulders 18a and 18b for axial location of mating bearing assemblies 22a and 22b that are shown here to be of the cartridge bearing type. Crank axle 4 includes end faces 19a and 19b and internally threaded bores 20a and 20b for threadable mating with crank fixing bolts (not shown) that serve to secure the respective crank arms to the crank axle 4 in the conventional manner. Crank axle 4 is shown here to be of hollow cylindrical geometry, including a through bore 15, which is the preferred design. Conventional crank axles 4 are usually constructed of steel material, which tends to result in a relatively heavy crank axle component.

It is understood that the crank axle 4, depicted in FIGS. 1a-c, is of a representative crank axle geometry that is utilized elsewhere in this specification. However, the requirements of a specific application may require adaptation of wide range of crank axle geometries not specifically described here. In general, a crank axle need only be a generally cylindrical element with provision for mounting two axially spaced crank arms and provision for at least two axially spaced bearings. Alternatively, splined portions 16a and 16b may have a wide range of geometries adapted for connection with a crank arm such that rotational torque may be transmitted between the crank axle and the mating crank arm. Also, bearing surfaces 14a and 14b may also have a wide range of geometries adapted to facilitate easy rotation of the crank axle 4. Threaded bores 20a and 20b are simply provided as a representative means to secure a crank arm to the crank axle 4 and a wide range of alternative means may be envisioned.

Figure 1D:
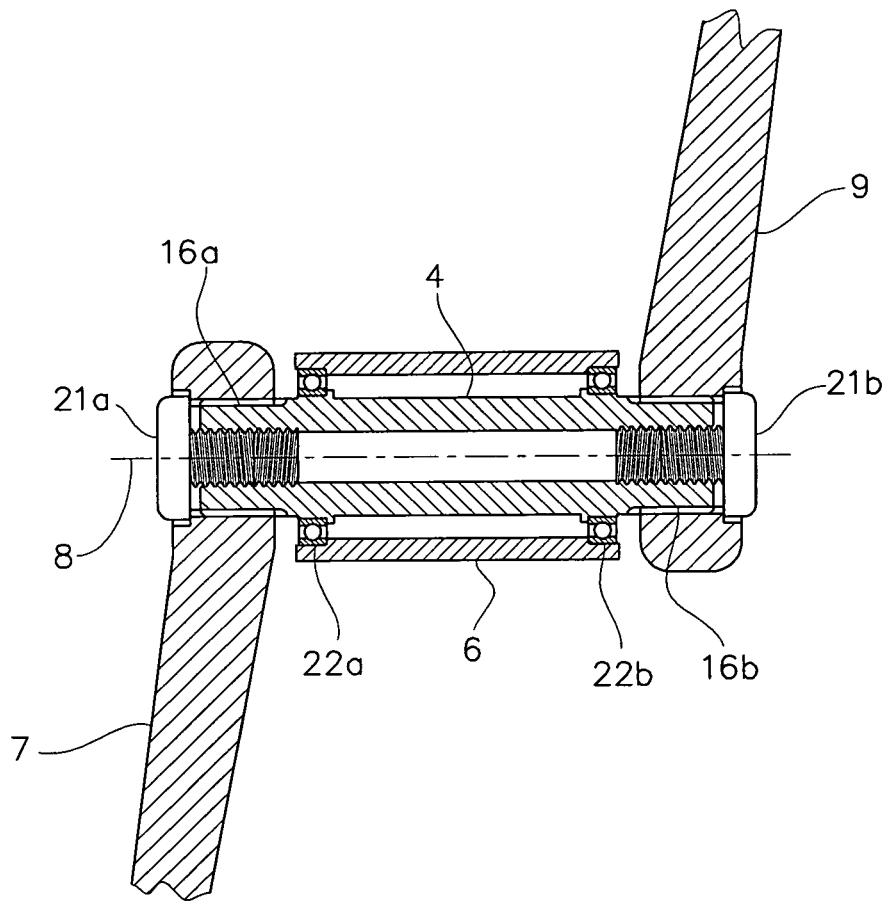
FIG. 1d is a partial cross section view showing the crank axle of FIGS. 1a-c, as assembled with bearings, crank arms and bottom bracket shell.

FIG. 1d shows a typical assembly of the crank axle 4 of FIGS. 1a-c with two axially spaced bearing assemblies 22a and 22b that are mounted within a bottom bracket shell 6 of the bicycle frame (not shown). Left crank arm 7 is removably connected and rotationally engaged to the left end of the crank axle 4 via splined portion 16a and axially secured in place by the fixing bolt 21a. Left crank arm 7 is thus axially and rotationally locked to crank axle 4. Similarly, right crank arm 9 is removably connected and engaged to the right end of the crank axle 4 via splined portions 16b and secured in place by the fixing bolt 21b.

Figure 2A:
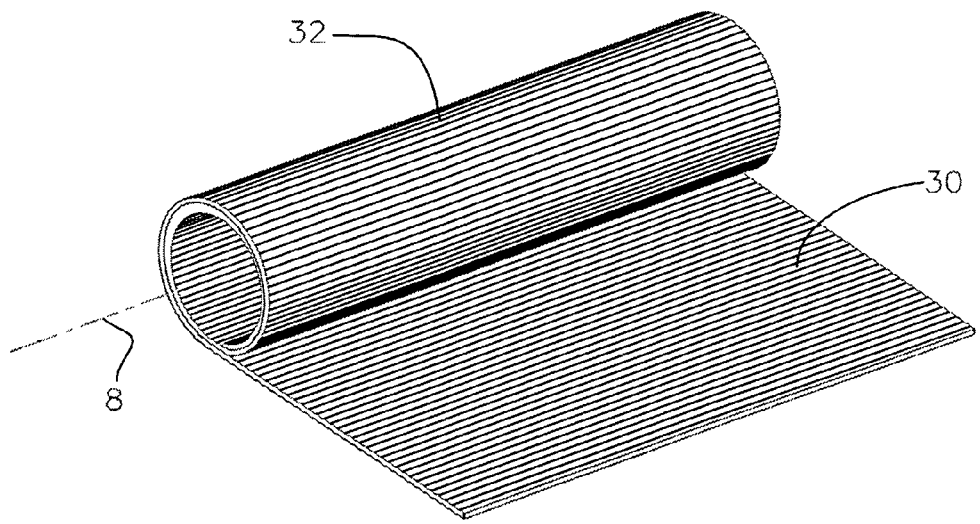
FIG. 2a is a perspective view schematically illustrating the fiber alignment of a tubular fiber-reinforced molding charge.

In the case of fiber-reinforced components, it is generally understood that fiber orientation plays a large role in the structural performance of the component. Fiber-reinforced components generally have greater strength and stiffness in a direction parallel to the longitudinal alignment of the fibers and lesser strength and stiffness in a direction perpendicular to the alignment of the fibers. Therefore it is preferable to orient the fibers in one direction or in several directions to optimize the structural performance for the final intended end use of the product. The example shown in FIGS. 2a-e shows how a cylindrical component, such as a crank axle, may be constructed or formed from multiple layers or plies of fiber-reinforced material of a variety of fiber orientations. As an example for illustration purposes, FIG. 2a shows how a cylindrical shape may be created by rolling plies or flat fiber reinforced sheet 30 into a cylindrical pre-form 32 that may subsequently be molded to create the corresponding cylindrical crank axle as described in FIGS. 3a-e.

Figure 2B:
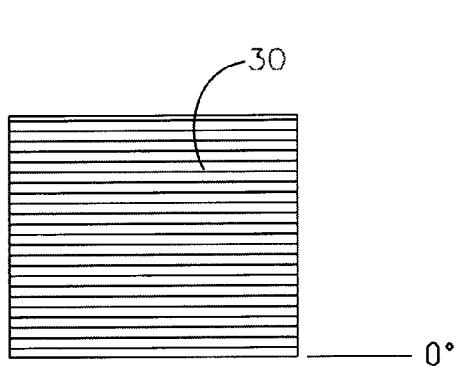
FIGS. 2b-e are diagrammatic views, describing fiber reinforcement and illustrating fiber orientations of 0°, 90°, 45° and 135° respectively.
Figure 2C:
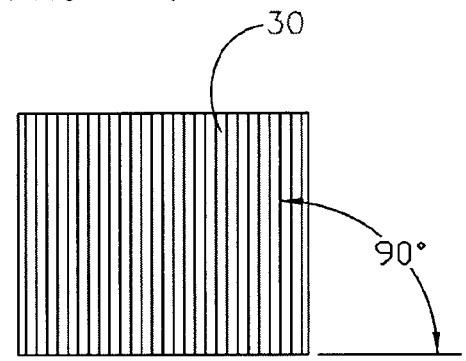
Figure 2D:
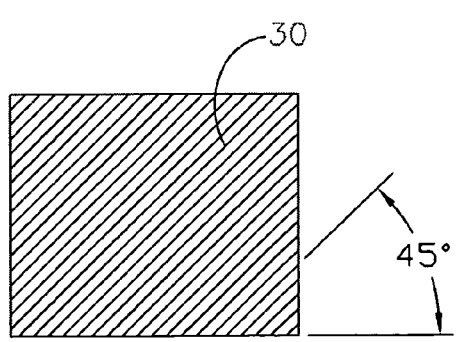
Figure 2E:
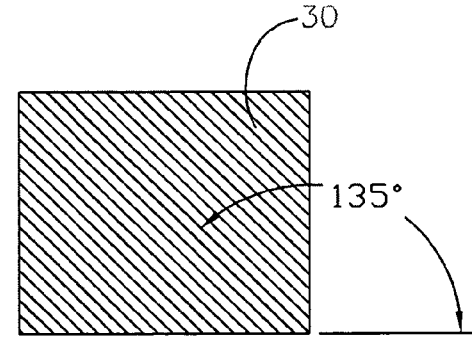

FIG. 2a shows the reinforcement fibers of the fiber-reinforced sheet 30 to be oriented at 0°, since these fibers are parallel to the axial axis 8. Additionally or alternatively, a wide range of fiber orientations may be utilized, as illustrated in FIGS. 2b-e. In this example, the 0° fibers of FIG. 2b show the fibers extending in a direction parallel to the axial axis and will tend to impart bending strength and axial tensile strength to the crank axle 4. The 90° fibers of FIG. 2c will tend to impart hoop strength and crush strength to the crank axle 4. The 45° and 135° fibers of FIG. 2d and FIG. 2e will tend to impart bi-directional torsional strength to the crank axle 4. These fibers are generally "continuous" in that they extend continuously and unbroken along the across the fiber-reinforced sheet. Several fiber-reinforced sheets of a variety of fiber orientations may be laminated or interwoven to create an optimized combination of properties. For a crank axle 4 application it is advantageous to include fibers in a generally 45° and 135° orientation. This aligns the fibers in a helical orientation to provide the requisite torsional strength and stiffness for a crank axle application.

The example shown in FIG. 2a show a "roll-wrapping" technique, which is merely one example of a fabrication technique shown here merely to illustrate the importance of fiber orientation. In FIGS. 2a-d, the fiber-reinforced sheet 30 is shown to be a "prepreg" sheet of reinforcing fiber that is pre-combined with uncured resin. Alternatively, a wide range of fiber types, fiber-reinforced starting materials, fiber lengths, fiber orientations and fabrication processes may be employed to construct a fiber-reinforced component.

Figure 3A:
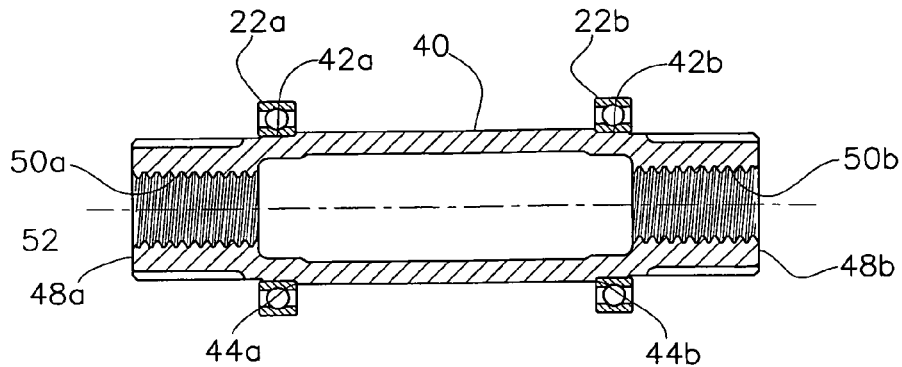
FIG. 3a is a cross-section view of a crank axle of fiber-reinforced material, including support bearings.

FIG. 3a shows crank axle 40 that is constructed entirely of fiber-reinforced material, which has excellent structural properties and is has a lower density than steel for a significant reduction in weight. It is preferable that the fiber-reinforced material consist of fibers in a polymer resin matrix, where the matrix serves to bind the fibers together and also to transmit shear loads between adjacent fibers. It is generally understood that longer fibers result in greater structural performance in comparison to shorter fibers. Thus it is also preferable that these fibers be generally continuous, rather than discontinuous or "short" fibers, thereby providing a strength advantage. It is further preferable that these fibers be characterized as high-strength fibers, such as carbon fibers, aramid fibers, liquid-crystal fibers, PBO fibers, etc. Of these fiber types, carbon fibers generally possess some of the best performance characteristics for this application. The resin matrix may be a thermoset resin, such as epoxy or vinylester or it may be a thermoplastic resin such as polyamide, polyester or any of a wide range of available thermoplastic resins. Fiber reinforced materials as described here may also be termed "composite" material or, in the case where high-strength fibers are used, they may also be termed "advanced composite". There is a wide range of manufacturing processes by which a fiber reinforced crank axle may be produced. These processes are well known in industry and may include filament winding, roll wrapping, resin transfer molding, bladder molding, compression molding, prepreg layup, wet layup, among others. However, it should also be understood that these advanced composite materials are on the cutting edge of technology and new fibers, resins, and manufacturing processes are continually being developed that may be applicable to the present invention.

Crank axle 40 of FIG. 3a includes cylindrical bearing surfaces 42a and 42b with corresponding shoulders 44a and 44b for axial location of mating bearing assemblies 22a and 22b that are shown here to be of the cartridge bearing type. Crank axle 40 includes end faces 48a and 48b and internally threaded bores 50a and 50b for threadable mating with corresponding crank bolts (not shown) that serve to fasten the corresponding crank arms to the crank axle 40. Crank axle 40 is shown here to be a structural hollow cylindrical shell, including a through bore 52 that extends along the axial axis 8, which is the preferred design. However, it is also envisioned that the bore 52 of the crank axle may alternatively include internal bulkhead reinforcement portions or may be filled with low-density material such as foam. A further alternative design may be of generally solid construction.

It should be noted that the crank axle 40 is a one-piece or continuous crank axle that extends to pass through the two axially spaced supporting bearing assemblies 22a and 22b. This is the preferred arrangement, since it permits continuous and uninterrupted structural geometry to extend between these radial supporting locations. This serves to minimize or eliminate any structural interruptions or weaknesses in this highly stressed region. This is in contrast to split axle designs where the discontinuous crank axle is split or otherwise connected together at a location adjacent the or between supporting bearings 22a and 22b, resulting in a weakened region at this connection. Further, it is preferable that long or continuous fiber reinforcement be utilized in fabrication of the crank axle 40. Continuous fibers generally have better structural properties than discontinuous or broken fibers. To maximize structural properties, this continuous fiber may extend, generally without interruption, axially between the supporting bearings or to further extend generally along the entire axial length of the continuous crank axle or to its interface with the crank arm to thereby optimize its structural properties in this highly stressed region.

To provide the optimal structural properties of the crank axle 40, it is generally preferable to design the crank axle to be as large a diameter as geometrical constraints will permit. A larger diameter crank axle 40 may be designed to be lighter and/or have higher structural properties in comparison with a smaller diameter crank axle 40. Given current bicycle frame geometry, it is preferable that the crank axle 40 has an outside diameter in the range of 22 mm to 35 mm.

While the term "hollow" generally connotes an outer structural shell that surrounds a cavity, it is common for advanced composite components to utilize a low-density material, such as foam or other core material to fill or partially fill the cavity. These low-density "core materials" generally work in compression to provide crush strength to the finished component and/or to connect opposing walls of the structural shell. Such core materials may provide increased structural performance when the structural shell is not completely self-supporting. For the purposes of describing the present invention, the term "hollow" may include a cavity filled with a low-density core material.

While fiber-reinforced material has many excellent structural properties, it does not necessarily have high hardness characteristics. Also, depending on the geometry and processing involved, it may be difficult to maintain these elevated structural properties in regions of abrupt geometry changes. For these reasons, it may be advantageous to add pre-formed inserts to the fiber-reinforced crank axle to maintain the desired structural properties or to provide a region of higher hardness. These inserts may simply be subcomponents that are made from fiber reinforced material and then bonded or otherwise joined to the crank axle. These inserts may also be insert-molded with the crank axle during molding of the fiber-reinforced portion. In this case, the crank axle is molded or otherwise formed against the insert such that the matrix resin of the crank axle is adhered to the insert to create an integrally joined connection between the fiber reinforced crank axle portion and the insert portion. Alternatively, it may be preferable to integrally join the insert to the crank axle by adhesively bonding the two subcomponents. To insure a strong joinder, it is generally advisable to provide sufficient bonding surface area of overlap between the two subcomponents. Often, it is desirable to produce these inserts from a lightweight metallic material such as aluminum or titanium. These metallic materials are isotropic and may be easily machined to provide highly detailed geometry and also possess higher hardness than many composite materials. Additionally, hardened steel inserts may be utilized to create an integral bearing race circumferentially surrounding the crank axle.

For general definition purposes herein, an "integral" joinder is one that is integrated at the mating joining interface between the two components or portions being joined, thus creating an "integral" assembly. This integral joinder may not be easily disassembled at the service temperature without damaging at least one of the joined components or their mating joining interface surfaces. This integral joinder usually involves a mated joining interface directly between two components. This integral joining interface may include a welded or otherwise fused interface or a bonded or otherwise adhered interface or some other interface where the two mated joining surfaces are solidly "stuck" or joined to each other at a joining interface to create an integrated and unified structure. Preferably this joining interface is a surface interface, with a surface area, rather than a point or edge interface. The integral joinder is in contrast to a fastened joinder, where such a fastened joinder relies on a removable or semi-removable mechanical means to bind, secure or connect the two components to each other. In a fastened joinder, the two components may generally be separated without damaging joined components and/or their mating interface surfaces.

Further, for general definition purposes herein, an "integral crank axle" is a crank axle that is either a monolithic or an integrally joined one-piece crank axle in the region that extends between two axially spaced supporting bearings. This integral crank axle is in contrast to split (two piece) crank axle designs described herein and also described in U.S. Pat. Nos. 5,493,937 and 6,443,033, which utilize a mechanical connection at a location between the two axially spaced supporting bearings.

Figure 3B:
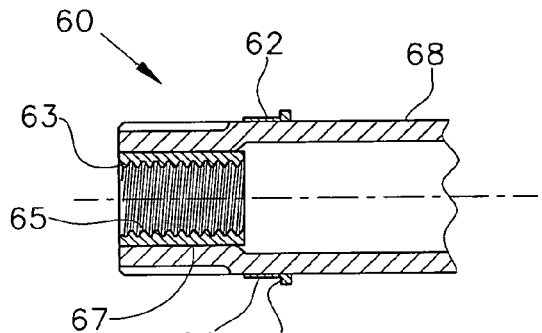
FIG. 3b is a partial cross-section view of a crank axle of fiber-reinforced material, including an external bearing interface insert and an internal threaded insert.
Figure 3C:
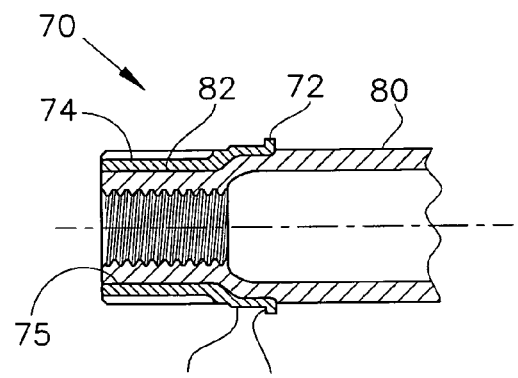
FIG. 3c is a partial cross-section view of a crank axle of fiber-reinforced material, including a combined crank arm interface and bearing interface insert.
Figure 3D:
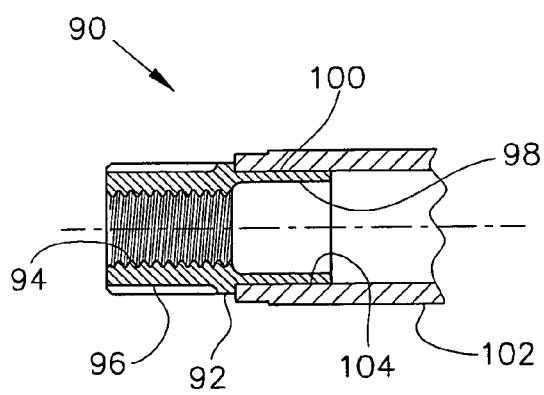
FIG. 3d is a partial cross-section view of a crank axle of fiber-reinforced material, including a crank arm interface insert.

FIGS. 3b-d describe a range of exemplary crank axle configurations that each utilize insert(s) as previously discussed. FIG. 3b describes crank axle assembly 60 that utilizes an annular bearing insert 62, which includes cylindrical bearing surface 64 and shoulder 66. Fiber-reinforced crank axle body 68 is a generally cylindrical element that extends axially through the annular bearing insert 62. Insert 62 is shown here to be adapted to fitment of the inner race of a bearing assembly (not shown). Alternatively, bearing insert 62 may be designed as an integral bearing race where a bearing, such as a rolling or sliding element, is in direct contact with the bearing insert 62. In this respect, bearing insert 62 may be considered to be a bearing interface insert. Crank axle 60 is otherwise similar to crank axle 40. It should be noted that bearing insert 62 is an external insert that completely circumscribes the outside diameter of the fiber-reinforced crank axle body 68.

Additionally, crank axle assembly 60 includes a threaded insert 63 with internal threads 65 for threadable connection with a fixing bolt (not shown). Threaded insert 63 is integrally adhered to the fiber-reinforced crank axle body 68 at a joining interface 67. It should be noted that threaded insert 63 is an internal insert that is completely circumscribed by the inside diameter of the fiber-reinforced crank axle body 68.

FIG. 3c describes a crank axle assembly 70 that utilizes a spline insert 72, including spline surface 74 and inside diameter 75. Spline insert 72 also includes bearing surface 76 and shoulder 78 for fitment of a bearing assembly (not shown). The fiber reinforced crank axle body 80 is a generally tubular element and includes external surface 82. The pre-formed spline insert 72 is placed in a mold during molding of the crank axle body 80 such that the material of the crank axle body 80 conforms to the inside diameter 75 of the spline insert 72 to result in a matched contour with external surface 82. During this molding process, the molding resin of the crank axle body 80 adhesively bonds to the spline insert 72 at the interface between the external surface 82 and the inside diameter 75. Thus, spline insert 72 is integrally joined to the crank axle body 80. Crank axle 70 is otherwise similar to crank axle 40. Since the spline insert 72 also includes spline surface 74 as a means to removably connect to the crank arm (not shown) in the conventional manner, it may be considered to be a crank arm interface insert.

FIG. 3d describes a crank axle assembly 90 that utilizes an extension insert 92 that includes geometry to axially extend the fiber-reinforced crank axle body 102. Extension insert 92 includes internal threads 94 for engagement with a fixing bolt (not shown) and external splines 96 for engagement with mating internal splines of a crank arm (not shown) in the conventional manner. Extension insert 92 also includes an axially-extending sleeve 98, which includes a cylindrical outer surface 100. The fiber-reinforced crank axle body 102 is a generally tubular element with inside diameter 104. The extension insert 92 may be adhesively bonded to the crank axle body 102 at the interface between the outer surface 100 and the inside diameter 104. Thus, extension insert 92 is integrally joined to the crank axle body 102. In comparison with the embodiments of FIGS. 3b-c, it should be noted that extension insert 92 is an internal insert that is completely circumscribed by the inside diameter of the fiber-reinforced crank axle body 102.

It should be noted that the continuous circumscribing interfaces described in FIGS. 3b-d are not discontinuous around their mating circumferences, but instead may be considered as circumferentially closed cylindrical elements. This maintains the structural integrity of both the insert and the crank axle and results in a more structurally efficient joinder between the two portions. Further, it should be noted that the embodiments of FIGS. 3b-d are merely representative of a wide range of possible insert configurations that may be adapted to the present invention. While FIGS. 3b-d are partial views of representative embodiments that describe the left portion of the crank axle, it is understood that a right portion of the crank axle is implied and may be generally symmetrical with the left portion.

While the previous embodiments utilize a crank axle that is a separate component from its associated crank arms, it may be desirable to combine the crank axle with one or more of the crank arms to create an integral assembly. The fiber reinforced crank axle may be a pre-formed element that is permanently joined to a pre-formed crank arm of metallic or fiber-reinforced composite construction. Alternatively, either the crank arm or the crank axle may be molded to include the corresponding crank arm or crank axle as a pre-formed molding insert. However, it is generally preferable that the integral crank arm be constructed of composite materials and that the crank arm and crank axle be molded together as one contiguous unit.

FIGS. 4a-e describe an arrangement where right crank arm 122 is integrally joined or otherwise integrated with the right end 128 of crank axle 120 and the left crank arm 124 is removably assembled to the left end 130 of crank axle 120. FIGS. 4a-e show only the left crank arm 124, the crank axle 120, the right crank arm 122, and the crank bolt 126. It is understood that bearings 22a and 22b, and bottom bracket shell 6 may also be included in an arrangement similar to that shown in FIG. 1d. Left crank arm 124 includes a pedal end 112, located radially outboard from the crank axle 120 and an axle end 110, located adjacent to the crank axle 120. Pedal end 112 includes threaded hole 125 for mounting of a left pedal (not shown) and axle end 110 includes internal splines 134 to mate with external splines 132 of the crank axle 120. The axle end 110 of the left crank arm 124 is secured to crank axle 120 via crank bolt 126 in the conventional manner. Right crank arm 122 includes a pedal end 114, located radially outboard from the crank axle 120 and an axle end 116, located proximal to the crank axle 120. Pedal end 114 includes threaded hole 123 for mounting of a right pedal (not shown) and axle end 116 is integrally joined to the crank axle 120. Crank arm axis 127a extends along the longitudinal length of the right crank arm 122 between threaded hole 123 and crank axle 120 in a generally radial direction. Similarly, crank arm axis 127b extends along the longitudinal length of the left crank arm 124 between threaded hole 125 and crank axle 120 in a generally radial direction and generally orthogonal to the axial axis 8. As shown in FIGS. 4*c-e*, right crank arm 122 is a hollow element with a fiber reinforced structural shell 142 and an internal cavity 136 that extends generally along the crank arm axis 127*a* and also wraps circumferentially around the crank axle 120. As such, there is a circumferential joining interface 129 between circumferentially overlapping surfaces of the right crank arm 122 and the crank axle 120. The shell 142 includes axially inboard wall 140 and axially outboard wall 144. The sidewall 143 of the right crank arm 122 extends generally axially between the inboard wall 140 and the outboard wall 144. Crank axle 120 is a structural hollow tubular element with an internal cavity 138 and a tubular wall 146 that extends along the axial axis. While FIGS. 4*a-d* show the crank axle 120 integrally connected to the right crank arm 122, it is understood that the crank axle 120 may alternatively be integrally connected to the left crank arm 124.

A portion of tubular wall 146 intersects and extends generally axially through the inboard wall 140 to join with the outboard wall 144. It may be seen that the crank axle 120 extends to provide an axially-extending bridge between the axially inboard wall 140 and axially outboard wall 144. This bridge serves to structurally support the right crank arm 122 and to provide structural support of the joinder between the crank axle 120 and the right crank arm 122. Further, it may be seen that the outboard wall 144 extends to bridge across the tubular opening of internal cavity 138 at the right end 128 of the crank axle 120. This bridge serves as a bulkhead to provide structural support and rigidity to the tubular wall 146 of the crank axle 120.

The juncture of the crank axle 120 and the right crank arm 122 includes "intersecting-geometry" where the crank axle 120 extends axially within the right crank arm 122 generally along the axial axis 8 such that the crank axle 120 crosses the axially inboard portion (i.e. inboard wall 140) of the right crank arm 122 to join the axially outboard portion (i.e. outboard wall 142) of the right crank arm. This intersecting-geometry is illustrated in the embodiments of FIGS. 4*a-e*, 5*a-b*, 9*a-d*, 10*a-d* and 11*a-c*. This intersecting-geometry is in contrast to "continuous-geometry", as illustrated in the embodiments of FIGS. 6*a-d* and 7*a-e*, where the structural material (i.e. walls) of the crank axle extend continuously to form the structural material (i.e. walls) of the crank arm without crossing or intersection.

FIG. 4*c* shows that crank axle 120 also utilizes insert 152, which includes the internal threads 154 for engagement of the fixing bolt 126 and the external splines 132 for engagement with internal splines 134 of the left crank arm 124. Insert 152 also includes a sleeve portion 156 that is adhered or otherwise integrally joined to the inside diameter 157 of the tubular wall 146. End face 158 of the crank axle 120 is exposed to provide a radially extending shoulder for axial location of a bearing assembly (not shown).

It may be seen in FIG. 4*c* that both the crank axle 120 and the right crank arm 122 are made up of plies or layers of composite material, preferably molded from prepreg, a composite material in which reinforcement fibers, such as carbon fibers, are pre-impregnated with uncured resin, such as epoxy resin. This prepreg material is usually supplied in sheet form to include unidirectional or woven fibers, which may be wrapped and formed to achieve the desired pre-formed shape. This pre-form is then placed in a mold (not shown) and heat and compaction pressure are applied to the prepreg to consolidate the plies and to simultaneously cure out the resin of the crank axle 120 and the right crank arm 122. A hardened and integrally joined and molded structural component is thus created. Compaction pressure may be created through a variety of methods well known in industry. In this configuration, compaction pressure may be created through the utilization of pressurized bladders placed within internal cavities 136 and 138 during the molding process.

Some of the plies of the crank axle 120 are flared radially outwardly to overlap with mating plies of the inboard wall 140 as particularly shown in FIG. 4*c* to create a radially extending joining interface between the two. Other plies of the crank axle 120 extend through the inboard wall 140 and internal cavity 136 and are flared to overlap with outboard wall 144. Similarly, plies of the crank arm 122 may be extended to overlap with the plies of the crank axle 120 as shown. Further, additional plies may be arranged to span across the juncture between the crank axle 120 and the right crank arm 122. In this way, plies of continuous fiber are interleaved and extend to span across the joint or interface between the crank axle 120 and the right crank arm 122, thus significantly reinforcing the integral joinder between these two components. Low density foam plug 148 is located in the internal cavity 138 adjacent the right crank arm 122 to provide compression support to the crank axle 120. Prior to molding, a first internal bladder (not shown) is placed within internal cavity 136 and a second internal bladder (not shown) is placed within cavity 138. The uncured prepreg plies and the bladders constitute a pre-form, which is then placed within a mold cavity (not shown) that defines the external geometry of the combined right crank arm 122 and crank axle 120. The first bladder is wrapped around the crank axle 120 in the region adjacent the right crank arm and the foam plug 148 serves to maintain the internal shape of the crank axle 120 during molding. The mold is then heated and the bladders are pressurized with air such that the plies are consolidated and the resin is cured. Such a bladder-molding process is well known in industry. The crank axle 120 and the crank arm 122 are thus co-molded or otherwise simultaneously molded, adhered to each other and integrally joined. It may also be seen in FIGS. 4*c-e* that crank arm 122 also includes an internal wall or septum 150 that spans in a generally axial direction between inboard wall 140 and outboard wall 144. This septum 150 serves to provide a rigidlink between the inboard wall 140 and outboard wall 144, thus providing greater structural integrity to the right crank arm 122.

Internal cavity 136 is also shown to extend to wrap around the crank axle 120 as shown in FIGS. 4*c-d*. Thus, it may be seen that the plies of the right crank arm 122 circumferentially wrap around the crank axle 120 to include a circumferential joining interface 129 therebetween. While the geometry of the insert 152 implies a removable connection with a left crank arm (not shown) 124, it is understood that the left crank arm 124 may alternatively be integrally joined to the crank axle 120 in a similar manner as the right crank arm 122.

While the bladder molding process as described above may be the preferred molding method to produce the crank arm 122 and crank axle 120 assembly, several alternate molding methods may be employed, including resin transfer molding, filament winding, trapped silicone molding. Further, while hollow internal cavities 136 and 138 are shown here, these cavities may alternatively be filled with foam or other low-density material.

While FIGS. 4*c-d* shows internal cavity 136 to wrap around the crank axle 120, it is also envisioned that a portion of the wall of the crank axle may be directly overlapped and shared with a portion of the wall of the crank arm 122 as shown in FIGS. 5*a-b*. The embodiment of FIGS. 5*a-b* generally corresponds to the embodiment of FIGS. 4*a-e*, however FIGS. 5*a-b* illustrates an alternate structural and interface geometry between the right crank arm 164 and the crank axle 160. FIG. 5*a* roughly corresponds to FIG. 4*c* and shows the plies of the crank axle 160 to be collinear and nested to overlap with the plies of the sidewall 162 of right crank arm 164.

Crank axle 160 is a generally hollow tubular element with an internal cavity 168 and a tubular wall 176 and also includes axial axis 8, right end 163 and bulkhead wall 178. Right crank arm 164 is integrally joined or otherwise integrated with the right end 163 of crank axle 160. Crank arm axis 167a extends along the longitudinal length of the right crank arm 164 in a generally radial direction. As shown in FIGS. 5a-b, right crank arm 164 is a hollow element with a fiber reinforced structural shell 165 and an internal cavity 166 that extends generally along the crank arm axis 167a. The shell 165 includes axially inboard wall 170 and axially outboard wall 174. The sidewalls 173 of the right crank arm 164 extends generally axially between the inboard wall 170 and the outboard wall 174. Crank axle 160 is a structural hollow tubular element with an internal cavity 168 and a tubular wall 176 that extends generally along the axial axis 8.

In contrast to the embodiment of FIGS. 4a-e, internal cavity 166 of the right crank arm 164 does not wrap completely around the crank axle 160, nor does it include a septum. It may be seen in FIGS. 5a-b that plies of the crank axle 160 are interleaved with plies of the crank arm 164 and vice-versa in a manner similar to that previously described in FIGS. 4c-e. Crank axle 160 includes internal cavity 168 and foam plug 161, which serves to support the surrounding plies of fiber-reinforced material during molding and to provide compressive and crush strength to the crank axle 160 in this region. Bladders may be placed within internal cavities 168 and 166 and the molding process previously described may be utilized to co-mold and integrally connect the crank axle 160 and right crank arm 164. For the purposes of definition herein, the term "co-mold" refers to parts of a structure that are simultaneously molded with a common surface interface.

A portion of tubular wall 176 intersects and extends through the inboard wall 170 to join with the outboard wall 174. It may be seen that the crank axle 160 extends to provide an axial bridge between the axially inboard wall 170 and axially outboard wall 174. This bridge serves to structurally support the right crank arm 164 and to provide structural support of the joinder between the crank axle 160 and the right crank arm 164. As such, the juncture of the crank axle 160 and the right crank arm 164 include intersecting-geometry as described hereinabove. Further, it may be seen that the bulkhead wall 178 and outboard wall 174 both extend to bridge generally radially across the tubular wall 176 of the crank axle 160. These bridges serve to provide structural support and rigidity to the tubular wall 146 of the crank axle 120. It may also be seen that the plies of the right crank arm 164 are circumferentially wrapped to overlap the right end 163 of the crank axle 160 and to include a circumferential joining interface 169 therebetween. Further, there is a circumferential joining interface 169 between circumferentially overlapping plies of the right crank arm 164 and the crank axle 160. It is understood that a left crank arm (not shown) may also be integrally joined to the crank axle 160 in a similar manner.

As an alternative to the co-molded construction described in the embodiments of FIGS. 4a-e and FIGS. 5a-b, it is also envisioned that the crank arm and/or the crank axle may be pre-formed elements. For instance, the crank axle may be a preformed element that serves as a molding insert during the molding of the crank arm. Thus the crank arm is molded against the crank axle to overlap the crank axle and the matrix resin of the crank arm adheres to at least a portion of the pre-formed crank axle insert. When the crank arm is solidified, an integral connection between the crank arm and the crank axle is thus created. Alternatively, the crank arm may be a pre-formed element that serves as a molding insert in a crank axle molding process. Thus the crank axle is molded against the crank arm to overlap the crank arm and the matrix resin of the crank axle adheres to at least a portion of the pre-formed crank arm insert. When the crank axle is solidified, an integral connection between the crank axle and the crank arm is thus created. A further alternative may to utilize both a pre-formed crank axle and a pre-formed crank arm. In this case, the pre-formed crank axle and a pre-formed crank arm may be adhesively bonded, welded or otherwise integrally joined together at an interface between the two to create an integral connection between the two pre-formed components.

Whereas the embodiment of FIGS. 4a-d show the tubular geometry of the crank axle 120 to cross or otherwise intersect with the tubular geometry of the crank arm 122, the embodiment of FIGS. 6a-d show the cylindrical tubular walls 184 of the crank axle 180 to extend continuously to form the tubular walls 186 of the right crank arm 182. Tubular walls 184 and 186 surround cavities 181 that extend along the axial axis in the crank axle region and extend along the crank arm axis 187a in the crank arm 122 region. Thus the integral combination of the crank axle 180 and the crank arm 182 may be viewed as having "continuous-geometry" to create a continuous L-shaped tubular structural element, including a bent region 188. In the case where these components are bladder-molded, a single continuous bladder may be utilized to form both the crank axle 180 and the crank arm 182. Crank arm axis 183a extends along the longitudinal length of the right crank arm 182 in a generally radial direction. It is also preferable to create a continuous septum 190 that extends along the length of the right crank arm 182 and spans generally parallel to the axial axis 8 to rigidly connect the inboard wall 192 and the outboard wall 194 to prevent independent movement between these opposing wall portions and thereby increase the structural integrity of the right crank arm 182. Septum 190 further extends through bent region 188 and through the crank axle 180 and spans generally parallel to the crank arm axis 183a to prevent independent movement between opposing wall portions provide reinforcement to the crank axle 180. While the septum 190 is shown here to extend generally axially, a septum may alternatively be oriented in a range of other directions including the tangential direction.

Crank axle 180 axle also includes axial axis 8 and an annular pre-formed flange insert 193 that includes an axially extending cylindrical bearing portion 195 for mounting of a cartridge bearing assembly (not shown) and a radially extending flange portion 196 with threaded holes 198 for connection with the drive sprocket (not shown) commonly associated with bicycle crank arms. It is understood that flange portion 196 merely shows one representative method for connecting a drive sprocket to the crank arm 182. A wide range of alternate methods may be substituted, including integrally molding a flange to the crank axle 180 or to the crank arm 182 for connection with the drive sprocket(s). Crank axle 180 also includes external splines 187 for engagement with internal splines 189 of left crank arm 185 in the manner previously described.

FIGS. 7a-e describe an embodiment similar to FIGS. 6a-d, however this figure shows an arrangement where the right crank arm 202 and the left crank arm 204 are both integrally connected to the crank axle 200 in a manner similar to that described in FIGS. 6a-d. Thus the crank assembly 206 includes the integral combination of the crank axle 200, the right crank arm 202 and the left crank arm 204 and, as such, may be viewed as a continuous S-shaped tubular element, including bent region 208 between the right crank arm 202 and the crank axle 200 and bent region 210 between the left crank arm 204 and the crank axle 200. The junctures of the crank axle 200 with the right crank arm 202 and with the left crank arm 204 are shown to include continuous-geometry as described hereinabove. It is also preferable to include a continuous septum 220 that extends through crank axle 200 and bent regions 208 and 210 and through at least a portion of right crank arm 202 and left crank arm 204. The septum 220 portion within the crank axle 200 extends along the axial axis 8 and spans to bridge across opposing wall portions in a direction generally parallel to the crank arm axis 203a and 203b as shown. The septum 220 portions within the right crank arm 202 and the left crank arm 204 extend along the crank arm axis 203a and 203b respectively and spans to bridge across opposing wall portions in a direction generally parallel to the axial axis 8 as shown. This may be considered as one of the lightest and most structurally efficient crank assembly arrangements. Crank axle 200 also includes axial axis 8 and external bearing inserts 212a and 212b for mounting of cartridge bearing assemblies (not shown).

Figure 8:
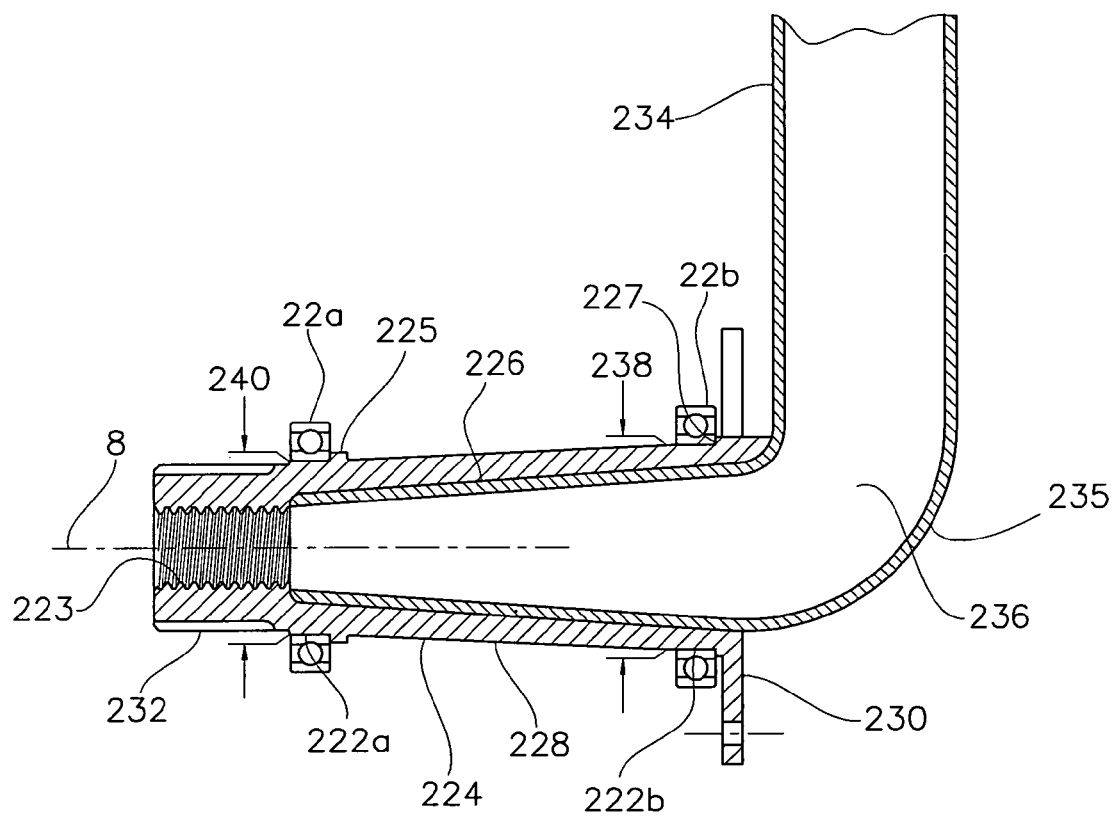
FIG. 8 is a radial cross section view of an additional embodiment of the present invention, including an integral crank arm and crank axle, and including supporting bearings and a reinforcement insert.

FIG. 8 describes an embodiment similar to FIG. 6b, however the crank axle 224 is a hybrid crank axle that is composed of fiber-reinforced portion 226 and an insert portion 228. Thus the fiber reinforced portion 226 and the insert portion 228 are overlapped and adhered to each other along their contacting interface that extends over essentially the entire length of the crank axle 224, resulting in an integral joinder between the two. Having such a large overlapping surface area between the insert portion 228 and the fiber reinforced portion 226 permits a larger adhered interface area for a stronger integral joinder between the two. Further, insert portion 228 provides reinforcement of the fiber-reinforced portion 226, and vice-versa, providing additional strength in this highly stressed region. To this degree, insert portion 228 may be considered to be a reinforcement insert. Insert portion 228 includes bearing surfaces 222a and 222b and extends between supporting bearing assemblies 22a and 22b. Insert portion 228 also includes a spider 230 for fitment of the drive sprockets (not shown) and a splined portion 232 for fitment of a left crank arm (not shown) and a threaded hole 223 to mate with a fixing bolt (not shown). Insert portion 228 also includes shoulder flange 225 for axial location of bearing assembly 22a and shoulder 227 for axial location of bearing assembly 22b. Fiber-reinforced portion 226 is contiguous with the right crank arm 234 and is a hollow element with internal cavity 236. The cylindrical walls of the fiber-reinforced portion 226 extend continuously to form right crank arm 234, including bent portion 235. Thus, the crank axle 224 is integral and contiguous with the right crank arm 234.

It should be noted that the interface between the insert portion 228 and the fiber-reinforced portion 224 is a tapered conical surface with the larger diameter adjacent the contiguous right crank arm 234. This permits the maximum possible diameter of the fiber-reinforced portion 226 to provide the highest strength in the most highly stressed region adjacent the junction between the crank axle 224. Likewise, this permits the wall thickness of the insert portion 228 to be thicker in the region adjacent the left crank arm (not shown). The outside diameter of bearing surface 222b corresponds with the inside diameter 238 of bearing assembly 22b. Likewise, the outside diameter of bearing surface 222a corresponds with the inside diameter 240 of bearing assembly 22a. It should be noted that inside diameter 238 is larger than the inside diameter 240, thus permitting a still larger diameter of the fiber-reinforced portion 226 and further increasing the strength in the highly stressed region adjacent the junction between the crank axle 224. Thus the inside diameter 238 of bearing assembly 22b is larger than the inside diameter 240 of bearing assembly 22a. This permits the shoulder flange 225 to be assembled through the inside diameter 238 of the bearing assembly 22b, yet still be sized to have axial locating engagement with the inner race of the smaller bearing assembly 22a.

FIGS. 9a-d describe an embodiment similar to FIGS. 4a-e, however crank axle 250 is shown to be a pre-formed element that is a molding insert during the molding of the right crank arm 270. As shown in FIG. 9a, Crank axle assembly 249 includes crank axle 250 and flange cap 254. Crank axle 250 is a separate pre-formed tubular element including an outside diameter 252, an inside diameter 253 and a right end portion 255. Pre-formed flange cap 254 includes a radially extending flange portion 256 and an axially extending collar portion 259. Collar portion 259 is integrally joined to the inside diameter 253 (with adhesive, for example) at joining interface 258 such that flange portion 256 extends radially outboard of the outside diameter 252. Next, as shown in FIG. 9b, crank axle assembly 249 is placed in a mold, which consists of mold halves 260a and 260b with mold cavities 262a and 262b respectively, such that the right end portion 255 extends within the mold cavities 262a and 262b. Next, as shown in FIG. 9c, a crank arm molding charge 264 is placed within the mold cavities 262a and 262b to circumferentially wrap around the crank axle assembly 249 as shown in a manner similar to that described in FIGS. 4a-e. With an internal bladder (not shown) inflated, the molding charge 264 is pressed against the crank axle assembly 249 and the walls of the mold cavities 262a and 262b. The molding charge 264 is now circumferentially overlapping the right end 255 of the crank axle 250. Upon curing or hardening of the mold charge 264, the right crank arm 270 is thus formed, which is also now adhered to the outside diameter 252 and the flange portion 256 of the crank axle assembly 249 (due to the adhesive qualities of the mold charge) at a circumferential joining interface 268 to provide an integral joinder therebetween. The integrally combined crank axle assembly 249 and right crank arm 270 (with crank arm axis 272) is removed from the mold halves 260a and 260b as shown in FIG. 9d. The right crank arm 270 had also been molded to include a pedal hole 271 for connection with a pedal (not shown).

While FIGS. 4a-e, 5a-b, 6a-d, and 7a-f all show the crank axle to be co-molded with one or both of the crank arms, FIGS. 9a-d is a representative embodiment that illustrates that the crank axle may be a pre-formed element that is a molding insert during molding of the crank arm. Further, the embodiment of FIG. 9a-d is illustrative of an intersecting-geometry juncture between the crank axle assembly 249 and the crank arm 70 where the crank axle assembly 249 extends within the crank arm generally along the axially axis 8. Further, this embodiment is representative of an arrangement where a pre-formed auxiliary element (i.e. flange cap 254) may be incorporated into the assembly to increase the surface area of the joining interface 268 or otherwise augment the joinder between the crank axle 250 and the crank arm 270.

FIGS. 10a-d describe an embodiment similar to FIGS. 4a-e, however crank arm 274, including crank arm axis 285, is shown to be a pre-formed element that is a molding insert during the molding of the crank axle 286. As shown in FIG. 10a, crank arm 274 is shown as a pre-formed element of non-hollow or solid construction that includes necked opening 276. Next, as shown in FIG. 10b, crank axle 286 is placed in a mold, which consists of mold halves 278a and 278b with mold cavities 280a and 280b respectively. Next, as shown in FIG. 10c, a fiber-reinforced tubular crank axle molding charge 282 is placed within the mold cavities 280a and 280b and through necked opening 276. An internal bladder (not shown) may be placed within the internal cavity 283 of the molding charge 282. When the bladder is inflated, the molding charge 282 is pressed against the necked opening 276 and the walls of the mold cavities 280a and 280b. Upon curing or hardening of the molding charge 282, the crank axle 286 is thus formed, which is also now adhered to the crank arm 274 (due to the adhesive qualities of the molding charge) at a circumferential overlapping joining interface 281 to provide an integral joinder therebetween. The integrally joined and combined crank axle 286 and crank arm 274 is removed from the mold halves 260a and 260b as shown in FIG. 10d. The crank arm 270 also includes a pedal hole 284 for connection with a pedal (not shown).

FIGS. 10a-d is a representative embodiment that illustrates that the crank arm may be a pre-formed element that is a molding insert during molding of the crank axle. Further, the embodiment of FIG. 10a-d is illustrative of an intersecting-geometry juncture between the crank axle 286 and the crank arm 274 where the crank axle extends within the crank arm generally along the axially axis 8.

Figure 11C:
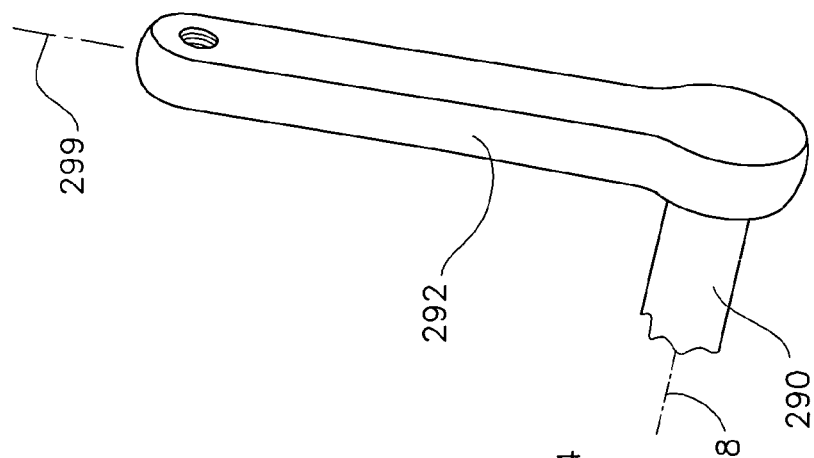
FIG. 11c is a partial perspective view of the embodiment of FIG. 11b, including the crank axle integrally joined to the crank arm.
Figure 11B:
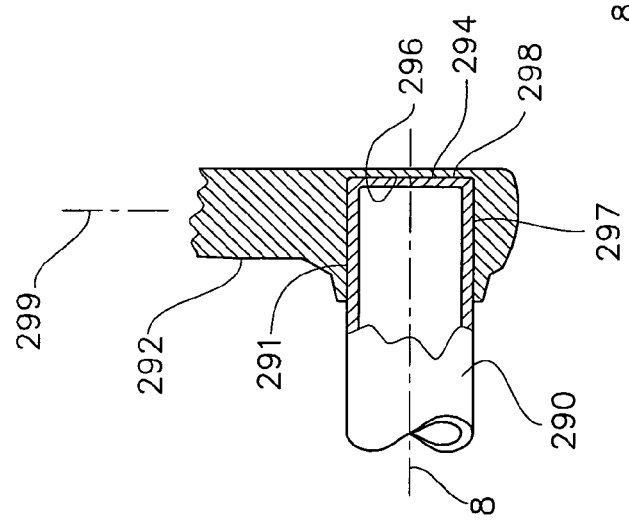
FIG. 11b is a partial cross section view of the embodiment of FIG. 11a, with the crank axle assembled to the crank arm, including adhesive at the joining interface therebetween.
Figure 11A:
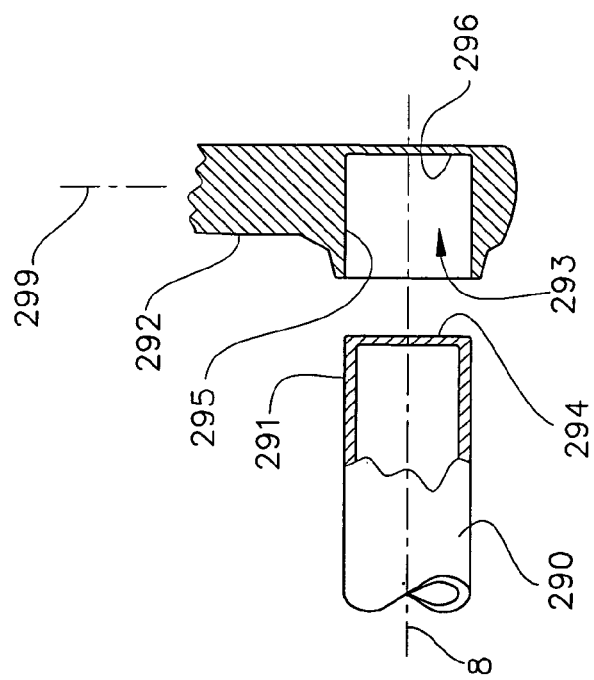
FIG. 11a is a partial cross section exploded view of a pre-formed crank axle and pre-formed crank arm of an additional embodiment of the present invention.

FIGS. 11a-c describe an embodiment similar to FIGS. 9a-d and 10a-d, however this embodiment illustrates that both the crank arm 292 and the crank axle 290 may be discreet pre-formed elements that are subsequently integrally joined together. As shown in FIG. 11a, crank arm 292 is shown as a pre-formed element of non-hollow or solid construction that includes crank arm axis 299 and a blind opening 293 with circumferential internal surface 295 and bottom surface 296. Crank axle 290 is shown to be a generally tubular hollow fiber-reinforced element with a cylindrical outer surface 291 and a closed end face 294. Prior to assembly of the crank axle 290 to the crank arm 292, the circumferential internal surface 295 and bottom surface 296 are coated with epoxy adhesive (not shown). Next, as shown in FIG. 11b, crank axle 290 is inserted in blind opening 293, with cylindrical outer surface 291 adjacent circumferential internal surface 295 and closed end face 294 adjacent bottom surface 296. When the epoxy adhesive is cured, these overlapping and adjacent surfaces become adhered to each other at the joining interfaces 297 and 298 and the integral joinder of the crank axle 290 and the crank arm 292 is thus achieved as shown in FIG. 11c.

FIGS. 11a-c is a representative embodiment that illustrates that both the crank arm and crank axle may be discreet pre-formed elements that are integrally joined together. Further, the embodiment of FIG. 11a-c is illustrative of an intersecting-geometry juncture between the crank axle 290 and the crank arm 292 where the crank axle extends within the crank arm generally along the axial axis 8. It should be noted that the use of epoxy adhesive is merely one representative method of achieving an integral joinder. A wide range of alternate means may be utilized as previously described.

While my above description contains many specificities, these should not be construed as limitations on the scope of the invention, but rather as exemplifications of embodiments thereof. It is to be understood that the invention is not limited to the illustrations described and shown herein, which are deemed to be merely illustrative of the best modes of carrying out the invention, and which are susceptible of modification of form, size, arrangement of parts and details of operation. For example:

The reinforcement insert portion 228 of FIG. 8 is shown to be an external insert that is surrounded by a fiber-reinforced portion 226 of the crank axle. Additionally or alternatively, it is also envisioned that a reinforcement insert may be an internal insert that is at least partially surrounded by a fiber-reinforced portion of the crank axle.

The inserts described in FIGS. 3a-d and FIG. 8 show a series of inserts that have a continuous circumscribing joining interface with their corresponding fiber-reinforced crank axle portions. However it is also envisioned that this interface may be discontinuous or interrupted such that this joining interface is not continuously circumferential about the axial axis. For example, the insert may contain a series of axially extending projections with gaps in between. Thus, a joining interface between the projections and the fiber-reinforced crank axle portion would be interrupted by these gaps.

The embodiment of FIGS. 6a-d describes a flange adapted to connect a drive sprocket to the right crank arm. It is also envisioned that the drive sprocket may instead be directly or indirectly connected to the left crank arm or to the crank axle.

Several embodiments described herein utilize an adhesive to create the integral joinder between the crank arm(s) and the crank axle. This adhesive may be the matrix resin of a molding charge or it may be separately applied adhesive. However, this is merely a preferred representative method of creating an integral joinder. A wide range of alternate methods may be utilized to create this integral joinder, including welding, brazing, etc. For example, plastic welding may be utilized, particularly if thermoplastic matrix resins are utilized.

Most of these embodiments utilize crank axles that are formed using fiber reinforced thermoset polymer material. While this is the preferred material, a wide range of alternate fiber reinforced materials may be utilized, including fiber reinforced thermoset polymer materials and fiber reinforced metallic materials.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A bicycle crankshaft assembly comprising:
   a crank axle including an axial axis, a first axle end, and a second axle end axially opposed to said first axle end;
   a first crank arm including a longitudinal axis;
   a second crank arm including a longitudinal axis;
   a first bearing supporting said crank axle adjacent said first axle end for rotation of said crank axle about said axial axis;
   a second bearing supporting said crank axle for rotation of said crank axle about said axial axis,
   wherein:
   said first crank arm is connected to said crank axle at a first crank arm interface;
   said second crank arm connected to said crank axle at a second crank arm interface axially spaced from said first crank arm interface;
   said second bearing is axially spaced from said first bearing;
   said crank axle includes reinforcement fibers for structural reinforcement of said crank axle;
   said crank axle is an integral one-piece element that extends axially between said first crank arm interface and said second crank arm interface, and wherein said crank axle extends axially outboard of said first bearing and extends axially outboard of said second bearing.

2. A bicycle crankshaft assembly according to claim 1, wherein said first crank arm interface is axially outboard said first bearing and said second crank arm interface is axially outboard said second bearing.

3. A bicycle crankshaft assembly according to claim 1, wherein said first crank arm is integrally joined to said crank axle at said first crank arm interface.

4. A bicycle crankshaft assembly according to claim 3, wherein said second crank arm is integrally joined to said crank axle at said second crank arm interface.

5. A bicycle crankshaft assembly according to claim 3 where said crank axle is a pre-formed molding insert and wherein said first crank arm is molded to be integrally joined to said crank axle.

6. A bicycle crankshaft assembly according to claim 3, wherein said first crank arm is a pre-formed molding insert and wherein said crank axle is molded to be integrally joined to said first crank arm.

7. A bicycle crankshaft assembly according to claim 3, wherein said crank axle and said first crank arm are co-molded to include an integral joinder therebetween at said first crank arm interface.

8. A bicycle crankshaft assembly according to claim 3, wherein said crank axle is a discreet pre-formed element and said first crank arm is a discreet pre-formed element and wherein said first crank arm is integrally joined to said crank axle at said first crank arm interface.

9. A bicycle crankshaft assembly according to claim 8, wherein said second crank arm is a discreet pre-formed element and wherein said second crank arm is integrally joined to said crank axle at said second crank arm interface.

10. A bicycle crankshaft assembly according to claim 8, wherein said first crank arm is integrally joined to said crank axle by means of adhesive at said first crank arm interface.

11. A bicycle crankshaft assembly according to claim 3, wherein said first crank arm is a hollow crank arm with an internal cavity and a structural outer structural wall and wherein said internal cavity extends generally parallel to said longitudinal axis of said first crank arm.

12. A bicycle crankshaft assembly according to claim 3, including a pre-formed auxiliary element, where said auxiliary element serves to augment said integral joinder between said first crank arm and said crank axle at said first crank arm interface.

13. A bicycle crankshaft assembly according to claim 1, wherein at least a portion of said reinforcement fibers are generally continuous reinforcement fibers that extend continuously between said first crank arm interface and said second crank arm interface.

14. A bicycle crankshaft assembly according to claim 1, wherein at least a portion of said reinforcement fibers are generally continuous reinforcement fibers that extend continuously to axially overlap said first bearing and said second bearing.

15. A bicycle crankshaft assembly according to claim 1, wherein at least a portion of said reinforcement fibers extend to at least one of said first crank arm interface and said second crank arm interface.

16. A bicycle crankshaft assembly according to claim 1, wherein at least a portion of said reinforcement fibers are carbon fibers.

17. A bicycle crankshaft assembly according to claim 1, wherein at least a portion of said reinforcement fibers are within a polymer matrix.

18. A bicycle crankshaft assembly according to claim 1, wherein said crank axle includes an insert integrally joined thereto.

19. A bicycle crankshaft assembly according to claim 18, wherein said insert is a crank arm interface insert to interface with at least one of said first crank arm and said second crank arm.

20. A bicycle crankshaft assembly according to claim 18, wherein said insert is a threaded insert that is operative to connect said crank axle to at least one of said first crank arm and said second crank arm.

21. A bicycle crankshaft assembly according to claim 18, wherein said insert is an extension insert, wherein said extension insert serves to axially outwardly extend said crank axle.

22. A bicycle crankshaft assembly according to claim 18, including a joining interface between said crank axle and said insert, wherein said joining interface is circumferential about said axial axis to at least partially circumscribe said crank axle.

23. A bicycle crankshaft assembly according to claim 18, wherein said insert is an internal insert that that axially overlaps and is circumscribed by at least a portion of said reinforcement fibers.

24. A bicycle crankshaft assembly according to claim 1, wherein said crank axle constitutes a structurally hollow element with a structural outer wall and an axially extending central hollow cavity.

25. A bicycle crankshaft assembly according to claim 24, wherein at least a portion of said central hollow cavity includes low-density supporting material having a density that is lower than said structural outer wall of said crank axle.

26. A bicycle crankshaft assembly according to claim 25, wherein said low density supporting material axially overlaps at least a portion of said first crank arm interface.

27. A bicycle crankshaft assembly according to claim 1, wherein said crank axle constitutes a structurally hollow element with a structural outer wall and an axially extending central hollow cavity, wherein said central hollow cavity includes a structural septum web.

28. A bicycle crankshaft assembly according to claim 27, wherein said septum web is aligned to be generally parallel to the longitudinal axis of at least one of said first crank arm and said second crank arm.

29. A bicycle crankshaft assembly according to claim 1, wherein said crank arm includes reinforcement fibers and wherein at least one of (1) said reinforcement fibers of said crank axle extend within said first crank arm and (2) said reinforcement fibers of said first crank arm extend within said crank axle.

30. A bicycle crankshaft assembly according to claim 1, wherein said first crank arm is integrally joined to said crank axle at said first crank arm interface including an integral joining interface therebetween, and wherein said integral joining interface extends axially to axially overlap at least a portion of said first crank arm interface.

31. A bicycle crankshaft assembly according to claim 1, wherein said first crank arm is removably connected to said crank axle at said first crank arm interface.

32. A bicycle crankshaft assembly according to claim 31, wherein said second crank arm is removably connected to said crank axle at said second crank arm interface.

33. A bicycle crankshaft assembly comprising:
a crank axle including an axial axis, a first axle end, and a second axle end axially opposed to said first axle end;
a first crank arm including a longitudinal crank arm axis, an axially inboard longitudinal portion, an axially outboard longitudinal portion, and an axial width between said inboard longitudinal portion and said outboard longitudinal portion;
a second crank arm including a longitudinal crank arm axis, an axially inboard longitudinal portion, an axially outboard longitudinal portion, and an axial width between said inboard longitudinal portion and said outboard longitudinal portion;

a first bearing supporting said crank axle adjacent said first axle end for rotation of said crank axle about said axial axis;
a second bearing supporting said crank axle for rotation of said crank axle about said axial axis,
wherein:
said first crank arm is connected to said crank axle at a first crank arm interface;
said second crank arm connected to said crank axle at a second crank arm interface axially spaced from said first crank arm interface;
said second bearing is axially spaced from said first bearing;
said crank axle includes reinforcement fibers for structural reinforcement of said crank axle;
said crank axle is an integral one-piece element that extends axially between said first crank arm interface and said second crank arm interface;
said first crank arm is integrally joined to said crank axle at said first crank arm interface; and
said crank axle has intersecting geometry with said first crank arm such that a portion of said crank axle extends axially outwardly to cross adjacent said inboard longitudinal portion of said first crank arm to a location axially outboard of said inboard longitudinal portion of said first crank arm.

34. A bicycle crankshaft assembly according to claim 33, wherein said first crank arm is a hollow crank arm with an internal cavity and a structural outer structural wall and wherein said internal cavity extends generally parallel to said longitudinal axis of said first crank arm.

35. A bicycle crankshaft assembly according to claim 34, wherein said first crank arm includes an internal cavity that circumferentially wraps around said crank axle about said axial axis to at least partially circumscribe said crank axle at said first crank arm interface.

36. A bicycle crankshaft assembly according to claim 33, wherein said first joining interface includes a circumferential overlapping interface between said first crank arm and said crank axle, wherein said circumferential overlapping interface at least partially circumscribes said crank axle about said axial axis.

37. A bicycle crankshaft assembly according to claim 33, wherein said first crank arm is a hollow crank arm with a structural outer wall and an internal hollow cavity, and wherein said crank axle is a hollow crank axle with a structural outer wall and an internal cavity, and wherein a portion of said outer wall of said first crank arm is shared with a portion of said outer wall of said crank axle.

38. A bicycle crankshaft assembly according to claim 33, wherein a portion of said first crank arm directly overlaps a portion of said outer wall of said crank axle in at least one of a circumferentially overlapping interface and an axially overlapping interface at said first crank arm interface.

39. A bicycle crankshaft assembly according to claim 33, wherein said crank axle extends axially outwardly to cross adjacent said inboard longitudinal portion of said first crank arm to said outboard longitudinal portion of said first crank arm.

40. A bicycle crankshaft assembly according to claim 33, wherein said first crank arm is a hollow crank arm with a structural outer wall and an internal hollow cavity, and wherein said inboard longitudinal portion is an axially inboard portion of said structural outer wall and said outboard longitudinal portion is an axially outboard portion of said structural outer wall, with said internal hollow cavity axially straddled between said inboard longitudinal portion and said outboard longitudinal portion of said first crank arm, and wherein said crank axle is integrally joined to both said inboard longitudinal portion and said outboard longitudinal portion of said first crank arm.

41. A bicycle crankshaft assembly according to claim 40, wherein at least a portion of said crank axle extends to axially bridge between said inboard longitudinal portion and said outboard longitudinal portion of said first crank arm.

42. A bicycle crankshaft assembly comprising:
a crank axle including an axial axis, a first axle end, and a second axle end axially opposed to said first axle end;
a first crank arm including a longitudinal axis;
a second crank arm including a longitudinal axis;
a first bearing supporting said crank axle adjacent said first axle end for rotation of said crank axle about said axial axis;
a second bearing supporting said crank axle for rotation of said crank axle about said axial axis,
wherein:
said first crank arm is connected to said crank axle at a first crank arm interface;
said second crank arm connected to said crank axle at a second crank arm interface axially spaced from said first crank arm interface;
said second bearing is axially spaced from said first bearing;
said crank axle includes reinforcement fibers for structural reinforcement of said crank axle; and
said crank axle is an integral element that extends axially between said first crank arm interface and said second crank arm interface; and
wherein at least one of said first crank arm and said second crank arm is a hollow crank arm with an internal cavity and a structural outer wall, including an axially inboard wall and an axially outboard wall with a structural septum wall bridging between said inboard wall and said outboard wall and extending generally parallel said corresponding axial axis.

43. A bicycle crankshaft assembly comprising:
a crank axle including an axial axis, a first axle end, and a second axle end axially opposed to said first axle end;
a first crank arm including a longitudinal axis;
a second crank arm including a longitudinal axis;
a first bearing supporting said crank axle adjacent said first axle end for rotation of said crank axle about said axial axis;
a second bearing supporting said crank axle for rotation of said crank axle about said axial axis,
wherein:
said first crank arm is connected to said crank axle at a first crank arm interface;
said second crank arm connected to said crank axle at a second crank arm interface axially spaced from said first crank arm interface;
said second bearing is axially spaced from said first bearing;
said crank axle includes reinforcement fibers for structural reinforcement of said crank axle; and
said crank axle is an integral element that extends axially between said first crank arm interface and said second crank arm interface;
wherein said first crank arm includes reinforcement fibers and wherein at least one of (1) said reinforcement fibers of said crank axle extend within said first crank arm and (2) said reinforcement fibers of said first crank arm extend within said crank axle; and wherein said reinforcement fibers of said crank axle overlap said reinforcement fibers of said first crank arm.

\* \* \* \* \*